US009600965B2

(12) United States Patent
Johnson et al.

(10) Patent No.: US 9,600,965 B2
(45) Date of Patent: Mar. 21, 2017

(54) METHOD AND APPARATUS FOR PROVIDING SECONDARY GAMING MACHINE FUNCTIONALITY

(71) Applicant: IGT, Las Vegas, NV (US)

(72) Inventors: Sam Johnson, Las Vegas, NV (US); Chad Ryan, Henderson, NV (US); Bradley G. Ward, Kingston, NV (US)

(73) Assignee: IGT, Las Vegas, NV (US)

(*) Notice: Subject to any disclaimer, the term of this patent is extended or adjusted under 35 U.S.C. 154(b) by 0 days.

(21) Appl. No.: 14/737,153

(22) Filed: Jun. 11, 2015

(65) Prior Publication Data

US 2015/0287282 A1 Oct. 8, 2015

Related U.S. Application Data

(63) Continuation of application No. 13/964,242, filed on Aug. 12, 2013, now Pat. No. 9,064,375, which is a (Continued)

(51) Int. Cl.

| | |
|---|---|
| ***G06F 17/00*** | (2006.01) |
| ***G06F 19/00*** | (2011.01) |
| ***G07F 17/32*** | (2006.01) |

(52) U.S. Cl.

CPC ........ *G07F 17/3244* (2013.01); *G07F 17/329* (2013.01); *G07F 17/3211* (2013.01); (Continued)

(58) Field of Classification Search

CPC ......................... G07F 17/3202; G07F 17/3216

See application file for complete search history.

(56) References Cited

U.S. PATENT DOCUMENTS

| | | | |
|---|---|---|---|
| 3,534,963 | A | 10/1970 | Weimer |
| 3,662,105 | A | 5/1972 | Parks |

(Continued)

FOREIGN PATENT DOCUMENTS

| | | |
|---|---|---|
| AU | 199650576 | 4/1997 |
| EP | 0769769 | 4/1997 |

(Continued)

OTHER PUBLICATIONS

Michael McCarthy, "Ads are here, there, everywhere," USA Today, Jun. 19, 2001.

(Continued)

*Primary Examiner* — Steven J Hylinski
(74) *Attorney, Agent, or Firm* — Neal, Gerber & Eisenberg LLP

(57) ABSTRACT

A modified gaming machine includes a plurality of gaming machine peripheral devices for use in implementing one or more games to a player, and a master gaming controller configured to implement primary gaming machine functionality, including generating and transmitting information to the plurality of gaming machine peripherals. The modified gaming machine further comprises a secondary controller interposed between one or more of the plurality of gaming machine peripheral devices and the master gaming controller, whereby the secondary controller may forward information generated by the master gaming controller to the gaming machine peripheral devices and transmit secondary information to the peripheral devices.

18 Claims, 4 Drawing Sheets

Related U.S. Application Data continuation of application No. 11/897,532, filed on Aug. 30, 2007, now Pat. No. 8,512,144, which is a continuation-in-part of application No. 11/686,755, filed on Mar. 15, 2007, which is a continuation-in-part of application No. 11/468,946, filed on Aug. 31, 2006, which is a continuation-in-part of application No. 10/689,407, filed on Oct. 20, 2003, now Pat. No. 7,335,106.

(52) U.S. Cl.
CPC ...... *G07F 17/3223* (2013.01); *G07F 17/3225* (2013.01); *G07F 17/3227* (2013.01); *G07F 17/3239* (2013.01); *G07F 17/3248* (2013.01); *G07F 17/3255* (2013.01); *G07F 17/3267* (2013.01); *G07F 17/3272* (2013.01)

(56) References Cited

U.S. PATENT DOCUMENTS

| | | | |
|---|---|---|---|
| 3,792,437 | A | 2/1974 | Blumenthal et al. |
| 3,931,504 | A | 1/1976 | Jacoby |
| 4,004,097 | A | 1/1977 | Spaulding |
| 4,071,689 | A | 1/1978 | Talmage |
| 4,072,930 | A | 2/1978 | Lucero |
| 4,124,109 | A | 11/1978 | Bissell et al. |
| 4,157,829 | A | 6/1979 | Goldman et al. |
| 4,218,011 | A | 8/1980 | Simjian |
| 4,261,012 | A | 4/1981 | Maloomian |
| 4,283,709 | A | 8/1981 | Lucero |
| 4,332,389 | A | 6/1982 | Loyd et al. |
| 4,335,809 | A | 6/1982 | Wain |
| 4,339,709 | A | 7/1982 | Brihier |
| 4,339,798 | A | 7/1982 | Hedges et al. |
| 4,357,624 | A | 11/1982 | Greenberg |
| 4,364,567 | A | 12/1982 | Goott |
| 4,365,810 | A | 12/1982 | Richardson |
| 4,373,726 | A | 2/1983 | Churchill et al. |
| 4,430,728 | A | 2/1984 | Beitel et al. |
| 4,448,419 | A | 5/1984 | Telnaes |
| 4,454,594 | A | 6/1984 | Heffron et al. |
| 4,455,025 | A | 6/1984 | Itkis |
| 4,467,424 | A | 8/1984 | Hedges et al. |
| 4,494,197 | A | 1/1985 | Troy et al. |
| 4,503,429 | A | 3/1985 | Schreiber |
| 4,521,014 | A | 6/1985 | Sitrick |
| 4,527,798 | A | 7/1985 | Siekierski et al. |
| 4,553,222 | A | 11/1985 | Kurland |
| 4,582,324 | A | 4/1986 | Koza et al. |
| 4,624,462 | A | 11/1986 | Itkis |
| 4,636,951 | A | 1/1987 | Harlick |
| 4,652,998 | A | 3/1987 | Koza et al. |
| 4,669,730 | A | 6/1987 | Small |
| 4,669,731 | A | 6/1987 | Clarke |
| 4,679,143 | A | 7/1987 | Hagiwara |
| 4,689,742 | A | 8/1987 | Troy et al. |
| 4,694,490 | A | 9/1987 | Harvey et al. |
| 4,704,725 | A | 11/1987 | Harvey et al. |
| 4,710,873 | A | 12/1987 | Breslow et al. |
| 4,743,022 | A | 5/1988 | Wood |
| 4,798,387 | A | 1/1989 | Richardson |
| 4,805,907 | A | 2/1989 | Hagiwara |
| 4,815,741 | A | 3/1989 | Small |
| 4,817,951 | A | 4/1989 | Crouch et al. |
| 4,842,278 | A | 6/1989 | Markowicz |
| 4,848,771 | A | 7/1989 | Richardson |
| 4,856,787 | A | 8/1989 | Itkis |
| 4,880,237 | A | 11/1989 | Kishishita |
| 4,882,473 | A | 11/1989 | Bergeron et al. |
| 4,926,327 | A | 5/1990 | Sidley |
| 4,965,825 | A | 10/1990 | Harvey et al. |
| 4,982,337 | A | 1/1991 | Burr et al. |
| 4,991,848 | A | 2/1991 | Greenwood et al. |
| 5,007,649 | A | 4/1991 | Richardson |
| 5,038,022 | A | 8/1991 | Lucero |
| 5,039,848 | A | 8/1991 | Stoken |
| 5,042,809 | A | 8/1991 | Richardson |
| 5,048,831 | A | 9/1991 | Sides |
| 5,058,055 | A * | 10/1991 | Takemoto .............. G06K 15/00 358/1.15 |
| 5,092,598 | A | 3/1992 | Kamille |
| 5,097,981 | A | 3/1992 | Degasperi et al. |
| 5,100,139 | A | 3/1992 | Di Bella |
| 5,105,184 | A | 4/1992 | Pirani et al. |
| 5,116,055 | A | 5/1992 | Tracy |
| 5,119,295 | A | 6/1992 | Kapur |
| 5,121,477 | A | 6/1992 | Koopmans et al. |
| 5,158,293 | A | 10/1992 | Mullins |
| 5,179,517 | A | 1/1993 | Sarbin |
| 5,221,838 | A | 6/1993 | Gutman |
| 5,223,698 | A | 6/1993 | Kapur |
| 5,233,423 | A | 8/1993 | Jernigan et al. |
| 5,265,874 | A | 11/1993 | Dickinson et al. |
| 5,275,400 | A | 1/1994 | Weingardt et al. |
| 5,276,312 | A | 1/1994 | McCarthy |
| 5,282,620 | A | 2/1994 | Keesee |
| 5,290,033 | A | 3/1994 | Bittner et al. |
| 5,297,802 | A | 3/1994 | Pocock et al. |
| 5,324,035 | A | 6/1994 | Morris et al. |
| 5,326,104 | A | 7/1994 | Pease et al. |
| 5,348,299 | A | 9/1994 | Clapper, Jr. |
| 5,351,970 | A | 10/1994 | Fioretti |
| 5,371,345 | A | 12/1994 | LeStrange |
| 5,377,975 | A | 1/1995 | Clapper, Jr. |
| 5,393,057 | A | 2/1995 | Marnell, II |
| 5,393,061 | A | 2/1995 | Manship et al. |
| 5,397,125 | A | 3/1995 | Adams |
| 5,398,932 | A | 3/1995 | Eberhardt et al. |
| 5,407,199 | A | 4/1995 | Gumina |
| 5,408,417 | A | 4/1995 | Wilder |
| 5,429,361 | A | 7/1995 | Raven et al. |
| 5,457,306 | A | 10/1995 | Lucero |
| 5,470,079 | A | 11/1995 | LeStrange et al. |
| 5,476,259 | A | 12/1995 | Weingardt |
| 5,477,952 | A | 12/1995 | Castellano et al. |
| 5,483,049 | A | 1/1996 | Schulze, Jr. |
| 5,487,544 | A | 1/1996 | Clapper, Jr. |
| 5,489,096 | A | 2/1996 | Aron |
| 5,502,636 | A | 3/1996 | Clarke |
| 5,505,449 | A | 4/1996 | Eberhardt et al. |
| 5,531,441 | A | 7/1996 | Dabrowski et al. |
| 5,536,008 | A | 7/1996 | Clapper, Jr. |
| 5,542,669 | A | 8/1996 | Charron et al. |
| 5,547,192 | A | 8/1996 | Ishibashi |
| 5,553,864 | A | 9/1996 | Sitrick |
| 5,559,312 | A | 9/1996 | Lucero |
| 5,562,284 | A | 10/1996 | Stevens |
| 5,564,700 | A | 10/1996 | Celona |
| 5,564,701 | A | 10/1996 | Dettor |
| 5,580,309 | A | 12/1996 | Piechowiak et al. |
| 5,580,311 | A | 12/1996 | Haste, III |
| 5,586,936 | A | 12/1996 | Bennett et al. |
| 5,586,937 | A | 12/1996 | Menashe |
| 5,588,913 | A | 12/1996 | Hecht |
| 5,595,538 | A | 1/1997 | Haste, III |
| 5,609,337 | A | 3/1997 | Clapper, Jr. |
| 5,611,730 | A | 3/1997 | Weiss |
| 5,613,679 | A | 3/1997 | Casa et al. |
| 5,613,912 | A | 3/1997 | Slater |
| 5,618,045 | A | 4/1997 | Kagan |
| 5,619,649 | A | 4/1997 | Kovnat et al. |
| 5,621,812 | A | 4/1997 | Deaton et al. |
| 5,628,684 | A | 5/1997 | Bouedec |
| 5,630,754 | A | 5/1997 | Rebane |
| 5,642,485 | A | 6/1997 | Deaton et al. |
| 5,643,086 | A | 7/1997 | Alcorn et al. |
| 5,645,485 | A | 7/1997 | Clapper, Jr. |
| 5,647,592 | A | 7/1997 | Gerow |
| 5,655,961 | A | 8/1997 | Acres et al. |
| 5,657,899 | A | 8/1997 | Stoken |
| 5,674,128 | A | 10/1997 | Holch et al. |
| 5,676,231 | A | 10/1997 | Legras |
| 5,678,679 | A | 10/1997 | Berman |

(56) References Cited

U.S. PATENT DOCUMENTS

| | | | |
|---|---|---|---|
| 5,697,843 | A | 12/1997 | Manship et al. |
| 5,702,304 | A | 12/1997 | Acres |
| 5,709,603 | A | 1/1998 | Kaye |
| 5,718,632 | A | 2/1998 | Hayashi |
| 5,720,483 | A | 2/1998 | Trinh |
| 5,722,890 | A | 3/1998 | Libby et al. |
| 5,735,432 | A | 4/1998 | Stoken et al. |
| 5,740,549 | A | 4/1998 | Reilly et al. |
| 5,741,183 | A | 4/1998 | Acres |
| 5,749,784 | A | 5/1998 | Clapper, Jr. |
| 5,759,102 | A | 6/1998 | Pease |
| 5,761,647 | A | 6/1998 | Boushy |
| 5,766,076 | A | 6/1998 | Pease et al. |
| 5,768,382 | A | 6/1998 | Schneier |
| 5,769,716 | A | 6/1998 | Saffari |
| 5,770,533 | A | 6/1998 | Franchi |
| 5,774,873 | A | 6/1998 | Berent et al. |
| 5,779,545 | A | 7/1998 | Berg et al. |
| 5,779,547 | A | 7/1998 | SoRelle et al. |
| 5,785,592 | A | 7/1998 | Jacobsen |
| 5,785,594 | A | 7/1998 | Seibert et al. |
| 5,788,573 | A | 8/1998 | Baerlocher et al. |
| 5,795,228 | A | 8/1998 | Trumbull |
| 5,796,389 | A | 8/1998 | Bertram |
| 5,797,085 | A | 8/1998 | Beuk |
| 5,800,269 | A | 9/1998 | Holch et al. |
| 5,809,482 | A | 9/1998 | Strisower |
| 5,810,664 | A | 9/1998 | Clapper, Jr. |
| 5,811,772 | A | 9/1998 | Lucero |
| 5,813,912 | A | 9/1998 | Shultz |
| 5,816,918 | A | 10/1998 | Kelly et al. |
| 5,818,019 | A | 10/1998 | Irwin, Jr. |
| 5,830,065 | A | 11/1998 | Sitrick |
| 5,830,067 | A | 11/1998 | Graves et al. |
| 5,833,536 | A | 11/1998 | Davids |
| 5,833,540 | A | 11/1998 | Miodunski et al. |
| 5,836,819 | A | 11/1998 | Ugawa |
| 5,851,148 | A | 12/1998 | Brune |
| 5,851,149 | A | 12/1998 | Xidos et al. |
| 5,855,515 | A | 1/1999 | Pease et al. |
| 5,871,398 | A | 2/1999 | Schneier et al. |
| D406,612 | S | 3/1999 | Johnson |
| 5,876,283 | A | 3/1999 | Parra et al. |
| 5,882,260 | A | 3/1999 | Marks et al. |
| 5,885,158 | A | 3/1999 | Torango et al. |
| 5,887,243 | A | 3/1999 | Harvey et al. |
| 5,907,321 | A | 5/1999 | Grossman et al. |
| 5,915,588 | A | 6/1999 | Stoken et al. |
| 5,919,090 | A | 7/1999 | Mothwurf |
| 5,919,091 | A | 7/1999 | Bell |
| 5,928,082 | A | 7/1999 | Clapper, Jr. |
| 5,934,671 | A | 8/1999 | Harrison |
| 5,941,771 | A | 8/1999 | Haste, III |
| 5,941,772 | A | 8/1999 | Paige |
| 5,941,773 | A | 8/1999 | Harlick |
| 5,944,606 | A | 8/1999 | Gerow |
| 5,949,042 | A | 9/1999 | Dietz, II et al. |
| 5,951,397 | A | 9/1999 | Dickinson |
| 5,952,640 | A | 9/1999 | Lucero |
| 5,954,582 | A | 9/1999 | Zach |
| 5,954,583 | A | 9/1999 | Green |
| 5,957,776 | A | 9/1999 | Hoehne |
| 5,959,277 | A | 9/1999 | Lucero |
| 5,964,660 | A | 10/1999 | James et al. |
| 5,967,896 | A | 10/1999 | Jorasch |
| 5,970,143 | A | 10/1999 | Schneier et al. |
| 5,971,271 | A | 10/1999 | Wynn et al. |
| 5,980,384 | A | 11/1999 | Barrie |
| 5,980,385 | A | 11/1999 | Clapper, Jr. |
| 5,984,779 | A | 11/1999 | Bridgeman et al. |
| 5,990,927 | A | 11/1999 | Hendricks et al. |
| 5,999,808 | A | 12/1999 | LaDue |
| 6,001,016 | A | 12/1999 | Walker |
| 6,003,013 | A | 12/1999 | Boushy et al. |
| 6,003,651 | A | 12/1999 | Waller |
| 6,010,404 | A | 1/2000 | Walker |
| 6,012,832 | A | 1/2000 | Saunders et al. |
| 6,012,982 | A | 1/2000 | Piechowiak et al. |
| 6,012,983 | A | 1/2000 | Walker |
| 6,012,984 | A | 1/2000 | Roseman |
| 6,015,344 | A | 1/2000 | Kelly et al. |
| 6,017,032 | A | 1/2000 | Grippo et al. |
| 6,019,283 | A | 2/2000 | Lucero |
| 6,024,640 | A | 2/2000 | Walker et al. |
| 6,038,666 | A | 3/2000 | Hsu |
| 6,048,269 | A | 4/2000 | Burns et al. |
| 6,049,823 | A | 4/2000 | Hwang |
| 6,050,895 | A | 4/2000 | Luciano, Jr. |
| 6,056,289 | A | 5/2000 | Clapper, Jr. |
| 6,059,289 | A | 5/2000 | Vancura |
| 6,062,981 | A | 5/2000 | Luciano, Jr. |
| 6,068,552 | A | 5/2000 | Walker et al. |
| 6,077,163 | A | 6/2000 | Walker |
| 6,078,338 | A | 6/2000 | Horan et al. |
| 6,079,711 | A | 6/2000 | Wei et al. |
| 6,089,975 | A | 7/2000 | Dunn |
| 6,089,982 | A | 7/2000 | Holch et al. |
| 6,093,100 | A | 7/2000 | Singer et al. |
| 6,099,408 | A | 8/2000 | Schneier et al. |
| 6,104,815 | A | 8/2000 | Alcorn et al. |
| 6,106,396 | A | 8/2000 | Alcorn et al. |
| 6,110,041 | A | 8/2000 | Walker |
| 6,113,098 | A | 9/2000 | Adams |
| 6,113,492 | A | 9/2000 | Walker |
| 6,113,493 | A | 9/2000 | Walker |
| 6,113,495 | A | 9/2000 | Walker et al. |
| 6,117,009 | A | 9/2000 | Yoseloff |
| 6,120,024 | A | 9/2000 | Lind |
| 6,135,884 | A | 10/2000 | Hedrick |
| 6,135,887 | A | 10/2000 | Pease |
| 6,139,431 | A | 10/2000 | Walker |
| 6,141,711 | A | 10/2000 | Shah |
| 6,142,369 | A | 11/2000 | Jonstromer |
| 6,142,876 | A | 11/2000 | Cumbers |
| 6,146,272 | A | 11/2000 | Walker et al. |
| 6,149,522 | A | 11/2000 | Alcorn et al. |
| 6,155,925 | A | 12/2000 | Giobbi et al. |
| 6,159,095 | A | 12/2000 | Frohm et al. |
| 6,161,059 | A | 12/2000 | Tedesco |
| 6,162,121 | A | 12/2000 | Morro et al. |
| 6,162,122 | A | 12/2000 | Acres |
| 6,168,521 | B1 | 1/2001 | Luciano et al. |
| 6,168,523 | B1 | 1/2001 | Piechowiak et al. |
| 6,174,233 | B1 | 1/2001 | Sunaga et al. |
| 6,174,234 | B1 | 1/2001 | Seibert, Jr. |
| 6,175,358 | B1 | 1/2001 | Scott-Jackson et al. |
| 6,182,221 | B1 | 1/2001 | Hsu |
| 6,183,361 | B1 | 2/2001 | Cummings et al. |
| 6,183,362 | B1 | 2/2001 | Boushy |
| 6,186,893 | B1 | 2/2001 | Walker et al. |
| 6,190,256 | B1 | 2/2001 | Walker et al. |
| 6,193,608 | B1 | 2/2001 | Walker et al. |
| 6,203,428 | B1 | 3/2001 | Giobbi et al. |
| 6,206,283 | B1 | 3/2001 | Bansal |
| 6,210,275 | B1 | 4/2001 | Olsen |
| 6,210,276 | B1 | 4/2001 | Mullins |
| 6,210,279 | B1 | 4/2001 | Dickinson |
| 6,217,448 | B1 | 4/2001 | Olsen |
| 6,220,961 | B1 | 4/2001 | Keane et al. |
| 6,223,166 | B1 | 4/2001 | Kay |
| 6,227,972 | B1 | 5/2001 | Walker |
| 6,231,445 | B1 | 5/2001 | Acres |
| 6,234,900 | B1 | 5/2001 | Cumbers |
| 6,241,606 | B1 | 6/2001 | Riendeau et al. |
| 6,244,957 | B1 | 6/2001 | Walker et al. |
| 6,244,958 | B1 | 6/2001 | Acres |
| 6,247,643 | B1 | 6/2001 | Lucero |
| 6,250,685 | B1 | 6/2001 | Walker et al. |
| 6,251,014 | B1 | 6/2001 | Stockdale et al. |
| 6,253,119 | B1 | 6/2001 | Dabrowski |
| 6,253,374 | B1 | 6/2001 | Dresevic et al. |
| 6,254,480 | B1 | 7/2001 | Zach |
| 6,263,258 | B1 | 7/2001 | Dabrowski |
| 6,264,560 | B1 | 7/2001 | Goldberg et al. |

(56) References Cited

U.S. PATENT DOCUMENTS 6,264,561 B1 7/2001 Saffari
6,267,671 B1 7/2001 Hogan
6,270,410 B1 8/2001 DeMar
6,273,820 B1 8/2001 Haste, III
6,280,318 B1 8/2001 Criss-Puszkiewicz
6,280,325 B1 8/2001 Fisk
6,280,326 B1 8/2001 Saunders
6,280,328 B1 8/2001 Holch et al.
6,285,868 B1 9/2001 LaDue
6,293,866 B1 9/2001 Walker
6,302,790 B1 10/2001 Brossard
6,302,791 B1 10/2001 Frohm et al.
6,302,793 B1 10/2001 Fertitta, III et al.
6,306,038 B1 10/2001 Graves et al.
6,307,956 B1 10/2001 Black
6,309,298 B1 10/2001 Gerow
6,312,332 B1 11/2001 Walker et al.
6,315,289 B1 11/2001 Sakamoto et al.
6,315,666 B1 11/2001 Mastera et al.
6,319,125 B1 11/2001 Acres
6,325,716 B1 12/2001 Walker et al.
6,334,614 B1 1/2002 Breeding
6,336,863 B1 1/2002 Baerlocher et al.
6,341,353 B1 1/2002 Herman
6,343,989 B1 2/2002 Wood et al.
6,358,150 B1 3/2002 Mir et al.
6,358,151 B1 3/2002 Enzminger et al.
6,364,768 B1 4/2002 Acres et al.
6,368,216 B1 4/2002 Hedrick et al.
6,368,218 B2 4/2002 Angell, Jr.
6,371,852 B1 4/2002 Acres
6,375,567 B1 4/2002 Acres
6,378,073 B1 4/2002 Davis
6,379,246 B1 4/2002 Debrowski
6,379,247 B1 4/2002 Walker et al.
6,383,076 B1 5/2002 Tiedeken
6,386,977 B1 5/2002 Hole
6,390,473 B1 5/2002 Vancura et al.
6,390,917 B1 5/2002 Walker et al.
6,402,614 B1 6/2002 Schneier et al.
6,409,595 B1 6/2002 Uihlein
6,409,602 B1 6/2002 Wiltshire
6,416,406 B1 7/2002 Duhamel
6,419,583 B1 7/2002 Crumby et al.
6,425,825 B1 7/2002 Sitrick
6,435,511 B1 8/2002 Vancura et al.
6,443,456 B1 9/2002 Gajor
6,443,837 B1 9/2002 Jaffe et al.
6,443,843 B1 9/2002 Walker
6,446,257 B1 9/2002 Pradhan et al.
6,447,395 B1 9/2002 Stevens
6,449,687 B1 9/2002 Moriya
6,450,885 B2 9/2002 Schneier et al.
6,453,319 B1 9/2002 Mattis et al.
6,454,648 B1 9/2002 Kelly et al.
6,454,649 B1 9/2002 Mattice et al.
RE37,885 E 10/2002 Acres et al.
6,459,440 B1 10/2002 Monnes et al.
6,460,848 B1 10/2002 Soltys et al.
6,471,591 B1 10/2002 Crumby
6,475,086 B2 11/2002 Zach
6,488,585 B1 12/2002 Wells
6,496,928 B1 12/2002 Deo
6,500,067 B1 12/2002 Luciano et al.
6,503,147 B1 1/2003 Stockdale et al.
6,508,710 B1 1/2003 Paravia et al.
6,508,711 B1 1/2003 Ono
6,514,141 B1 2/2003 Kaminkow et al.
6,517,435 B2 2/2003 Soltys et al.
6,517,436 B2 2/2003 Soltys et al.
6,520,857 B2 2/2003 Soltys et al.
6,524,184 B1 2/2003 Lind et al.
6,524,185 B2 2/2003 Lind
6,527,271 B2 3/2003 Soltys et al.
6,527,638 B1 3/2003 Walker et al.
6,530,835 B1 3/2003 Walker
6,530,836 B2 3/2003 Soltys et al.
6,530,837 B2 3/2003 Soltys et al.
6,533,276 B2 3/2003 Soltys et al.
6,533,662 B2 3/2003 Soltys et al.
6,533,664 B1 3/2003 Crumby
6,537,150 B1 3/2003 Luciano et al.
6,540,609 B1 4/2003 Paige
6,554,283 B2 4/2003 Vancura et al.
6,554,704 B2 4/2003 Nicastro et al.
6,561,903 B2 5/2003 Walker
6,569,015 B1 5/2003 Baerlocher et al.
6,569,017 B2 5/2003 Enzminger et al.
6,579,179 B2 6/2003 Poole et al.
6,579,180 B2 6/2003 Soltys et al.
6,579,181 B2 6/2003 Soltys et al.
6,581,161 B1 6/2003 Byford
6,582,310 B1 6/2003 Walker et al.
6,585,589 B2 7/2003 Okuniewicz
6,585,598 B2 7/2003 Nguyen
6,592,456 B2 7/2003 Walker et al.
6,595,857 B2 7/2003 Soltys et al.
6,598,788 B1 7/2003 Dabrowski
6,599,187 B2 7/2003 Gerow
6,599,193 B2 7/2003 Baerlocher et al.
6,620,046 B2 9/2003 Rowe
6,628,939 B2 9/2003 Paulsen
6,634,550 B1 10/2003 Walker
6,638,163 B2 10/2003 Moody
6,641,483 B1 11/2003 Luciano
6,645,068 B1 11/2003 Kelly et al.
6,648,757 B1 11/2003 Slomiany et al.
6,648,761 B1 11/2003 Izawa
6,652,380 B1 11/2003 Luciano
6,656,040 B1 12/2003 Brosnan et al.
6,656,044 B1 12/2003 Lewis
6,663,490 B2 12/2003 Soltys et al.
6,672,589 B1 1/2004 Lemke et al.
6,676,515 B1 1/2004 Baltz et al.
6,676,522 B2 1/2004 Rowe
6,679,775 B1 1/2004 Luciano et al.
6,682,421 B1 1/2004 Rowe
6,682,423 B2 1/2004 Brosnan et al.
6,685,559 B2 2/2004 Luciano et al.
6,685,567 B2 2/2004 Cockerille
6,692,005 B2 2/2004 Vancura et al.
6,702,670 B2 3/2004 Jasper
6,712,696 B2 3/2004 Soltys et al.
6,712,698 B2 3/2004 Paulsen et al.
6,722,978 B2 4/2004 Valenti
6,726,563 B1 4/2004 Baerlocher et al.
6,729,956 B2 5/2004 Wolf et al.
6,729,961 B1 5/2004 Millerschone
6,739,975 B2 5/2004 Nguyen
6,743,095 B2 6/2004 Cole et al.
6,749,500 B1 6/2004 Nelson et al.
6,749,510 B2 6/2004 Giobbi
6,758,393 B1 7/2004 Luciano
6,758,751 B2 7/2004 Soltys et al.
6,769,984 B2 8/2004 Duhamel et al.
6,786,819 B2 9/2004 Baerlocher et al.
6,800,029 B2 10/2004 Rowe et al.
6,843,723 B2 1/2005 Joshi
6,846,238 B2 1/2005 Wells
6,848,995 B1 2/2005 Walker et al.
6,852,029 B2 2/2005 Baltz et al.
6,863,611 B1 3/2005 Morrow et al.
6,869,362 B2 3/2005 Walker
6,880,079 B2 4/2005 Kefford
6,884,174 B2 4/2005 Lundy et al.
6,890,256 B2 5/2005 Walker et al.
6,896,618 B2 5/2005 Benoy et al.
6,905,411 B2 6/2005 Nguyen
6,908,384 B1 6/2005 Luciano, Jr.
6,913,534 B2 7/2005 DeFrees-Parrott et al.
6,916,246 B1 7/2005 Luciano, Jr.
6,924,903 B2 8/2005 Brooks et al.
6,935,946 B2 8/2005 Yoseloff
6,942,574 B1 9/2005 LeMay et al.

(56) References Cited

U.S. PATENT DOCUMENTS

| | | | | |
|---|---|---|---|---|
| RE38,812 | E | 10/2005 | Acres et al. | |
| 6,958,014 | B1 | 10/2005 | Luciano, Jr. et al. | |
| 6,960,132 | B2 | 11/2005 | Baerlocher et al. | |
| 6,966,834 | B1 | 11/2005 | Johnson | |
| 6,969,319 | B2 | 11/2005 | Rowe | |
| 6,984,174 | B2 | 1/2006 | Cannon et al. | |
| 6,991,543 | B2 | 1/2006 | Joshi | |
| 6,997,803 | B2 | 2/2006 | LeMay et al. | |
| 7,000,921 | B2 | 2/2006 | Schultz | |
| 7,001,278 | B2 | 2/2006 | Maya et al. | |
| 7,004,388 | B2 | 2/2006 | Kohta | |
| 7,004,837 | B1 | 2/2006 | Crowder, Jr. et al. | |
| 7,008,320 | B2 | 3/2006 | Rowe et al. | |
| 7,022,017 | B1 | 4/2006 | Halbritter et al. | |
| 7,025,676 | B2 | 4/2006 | Cole et al. | |
| 7,048,628 | B2 | 5/2006 | Schneider | |
| 7,056,215 | B1 | 6/2006 | Olive | |
| 7,063,617 | B2 | 6/2006 | Brosnan et al. | |
| 7,070,501 | B2 | 7/2006 | Cormack et al. | |
| 7,070,503 | B2 | 7/2006 | Rudolph | |
| 7,094,149 | B2 | 8/2006 | Walker et al. | |
| 7,111,845 | B2 | 9/2006 | Walker et al. | |
| 7,112,138 | B2 | 9/2006 | Hedrick et al. | |
| 7,118,478 | B2 | 10/2006 | Fayter et al. | |
| 7,137,889 | B1 | 11/2006 | Luciano | |
| 7,137,892 | B2 | 11/2006 | Sitrick | |
| 7,144,321 | B2 | 12/2006 | Mayeroff | |
| 7,153,210 | B2 | 12/2006 | Yamagishi | |
| 7,167,724 | B2 | 1/2007 | Yamagishi | |
| 7,223,172 | B2 | 5/2007 | Baerlocher et al. | |
| 7,241,219 | B2 | 7/2007 | Walker et al. | |
| 7,255,351 | B2 | 8/2007 | Yoseloff et al. | |
| 7,275,991 | B2 | 10/2007 | Burns | |
| 7,285,049 | B1 | 10/2007 | Luciano, Jr. et al. | |
| 7,290,072 | B2 | 10/2007 | Quraishi et al. | |
| 7,291,066 | B2 | 11/2007 | Gauselmann | |
| 7,297,062 | B2 | 11/2007 | Gatto et al. | |
| 7,322,885 | B1 | 1/2008 | Luciano, Jr. et al. | |
| 7,331,520 | B2 | 2/2008 | Silva | |
| 7,335,106 | B2 | 2/2008 | Johnson | |
| 7,337,330 | B2 | 2/2008 | Gatto | |
| 7,341,522 | B2 | 3/2008 | Yamagishi | |
| 7,357,714 | B2 | 4/2008 | Tessmer et al. | |
| 7,392,470 | B2 | 6/2008 | Kammler | |
| 7,416,485 | B2 | 8/2008 | Walker et al. | |
| 7,419,428 | B2 | 9/2008 | Rowe | |
| 7,467,999 | B2 | 12/2008 | Walker et al. | |
| 7,473,179 | B2 | 1/2009 | Xidos et al. | |
| 7,477,889 | B2 | 1/2009 | Kim | |
| 7,510,474 | B2 | 3/2009 | Carter, Sr. | |
| 7,520,810 | B2 | 4/2009 | Dabrowski | |
| 7,545,522 | B1 | 6/2009 | Lou | |
| 7,546,947 | B1 * | 6/2009 | Arias .................... | G06Q 20/04 235/380 |
| 7,552,341 | B2 | 6/2009 | Chen | |
| 7,594,855 | B2 | 9/2009 | Meyerhofer | |
| 7,611,409 | B2 | 11/2009 | Muir | |
| 7,644,861 | B2 | 1/2010 | Alderucci | |
| 7,674,177 | B2 | 3/2010 | Cole | |
| 7,674,180 | B2 | 3/2010 | Graham et al. | |
| 7,686,687 | B2 | 3/2010 | Cannon et al. | |
| 7,693,306 | B2 | 4/2010 | Huber | |
| 7,695,366 | B1 | 4/2010 | Holch | |
| 7,699,703 | B2 | 4/2010 | Muir | |
| 7,704,147 | B2 | 4/2010 | Quraishi et al. | |
| 7,753,789 | B2 | 7/2010 | Walker et al. | |
| 7,758,420 | B2 | 7/2010 | Saffari | |
| 7,771,271 | B2 | 8/2010 | Walker et al. | |
| 7,785,193 | B2 | 8/2010 | Paulsen | |
| 7,819,750 | B2 | 10/2010 | Lam et al. | |
| 7,827,488 | B2 | 11/2010 | Sitrick | |
| 7,846,017 | B2 | 12/2010 | Walker et al. | |
| 7,850,522 | B2 | 12/2010 | Walker et al. | |
| 7,867,086 | B2 | 1/2011 | Sitrick | |
| 7,883,417 | B2 | 2/2011 | Bruzzese | |
| 7,950,996 | B2 | 5/2011 | Nguyen | |
| 7,988,550 | B2 | 8/2011 | White | |
| 8,016,666 | B2 | 9/2011 | Angell | |
| 8,021,227 | B2 | 9/2011 | Baerlocher | |
| 8,023,133 | B2 | 9/2011 | Kaneko | |
| 8,038,527 | B2 | 10/2011 | Walker et al. | |
| 8,070,578 | B2 | 12/2011 | Michaelson et al. | |
| 8,070,590 | B2 | 12/2011 | Cannon et al. | |
| 8,096,872 | B2 | 1/2012 | Walker et al. | |
| 8,118,668 | B2 | 2/2012 | Gagner et al. | |
| 8,133,102 | B2 | 3/2012 | Dabrowski | |
| 8,152,624 | B2 | 4/2012 | Gerrard et al. | |
| 8,192,276 | B2 | 6/2012 | Walker | |
| 8,219,129 | B2 | 7/2012 | Brown | |
| 8,220,019 | B2 | 7/2012 | Stearns | |
| 8,282,465 | B2 | 10/2012 | Giobbi | |
| 8,282,490 | B2 | 10/2012 | Arezina | |
| 8,393,955 | B2 | 3/2013 | Arezina et al. | |
| 8,419,526 | B1 | 4/2013 | Cannon et al. | |
| 8,512,144 | B2 | 8/2013 | Johnson et al. | |
| 8,585,479 | B2 | 11/2013 | Ryan et al. | |
| 8,678,916 | B2 | 3/2014 | Cannon et al. | |
| 8,734,236 | B2 | 5/2014 | Arezina et al. | |
| 2001/0039204 | A1 | 11/2001 | Tanskanen | |
| 2001/0044337 | A1 | 11/2001 | Rowe | |
| 2002/0010013 | A1 | 1/2002 | Walker et al. | |
| 2002/0016202 | A1 | 2/2002 | Fertitta et al. | |
| 2002/0020603 | A1 | 2/2002 | Jones | |
| 2002/0025850 | A1 | 2/2002 | Hafezi | |
| 2002/0039917 | A1 | 4/2002 | Armstrong et al. | |
| 2002/0061778 | A1 | 5/2002 | Acres | |
| 2002/0072404 | A1 | 6/2002 | Gerow | |
| 2002/0077173 | A1 | 6/2002 | Luciano et al. | |
| 2002/0077174 | A1 | 6/2002 | Luciano et al. | |
| 2002/0077182 | A1 | 6/2002 | Swanberg | |
| 2002/0082070 | A1 | 6/2002 | Macke et al. | |
| 2002/0082071 | A1 | 6/2002 | Riendeau et al. | |
| 2002/0082085 | A1 | 6/2002 | Osterer | |
| 2002/0087641 | A1 | 7/2002 | Levosky | |
| 2002/0090986 | A1 | 7/2002 | Cote et al. | |
| 2002/0094869 | A1 | 7/2002 | Harkham | |
| 2002/0094871 | A1 | 7/2002 | Luciano et al. | |
| 2002/0098882 | A1 | 7/2002 | Lind et al. | |
| 2002/0098883 | A1 | 7/2002 | Packes, Jr. et al. | |
| 2002/0107066 | A1 | 8/2002 | Seelig | |
| 2002/0111206 | A1 * | 8/2002 | Van Baltz ............... | G07F 17/32 463/17 |
| 2002/0111207 | A1 | 8/2002 | Lind et al. | |
| 2002/0111209 | A1 | 8/2002 | Walker | |
| 2002/0111214 | A1 | 8/2002 | Lind et al. | |
| 2002/0113369 | A1 | 8/2002 | Weingardt | |
| 2002/0132661 | A1 | 9/2002 | Lind et al. | |
| 2002/0132666 | A1 | 9/2002 | Lind et al. | |
| 2002/0142841 | A1 | 10/2002 | Boushy | |
| 2002/0145035 | A1 | 10/2002 | Jones | |
| 2002/0147047 | A1 | 10/2002 | Letovsky et al. | |
| 2002/0147049 | A1 | 10/2002 | Carter, Sr. | |
| 2002/0163570 | A1 | 11/2002 | Phillips | |
| 2002/0169018 | A1 | 11/2002 | Schneier et al. | |
| 2002/0169021 | A1 | 11/2002 | Urie et al. | |
| 2002/0169623 | A1 | 11/2002 | Call | |
| 2002/0177479 | A1 | 11/2002 | Walker et al. | |
| 2002/0177480 | A1 | 11/2002 | Rowe | |
| 2002/0183046 | A1 | 12/2002 | Joyce | |
| 2002/0183105 | A1 | 12/2002 | Cannon et al. | |
| 2002/0196342 | A1 | 12/2002 | Walker | |
| 2002/0198044 | A1 | 12/2002 | Walker et al. | |
| 2003/0003988 | A1 | 1/2003 | Walker | |
| 2003/0004871 | A1 | 1/2003 | Rowe | |
| 2003/0008707 | A1 | 1/2003 | Walker | |
| 2003/0013512 | A1 | 1/2003 | Rowe | |
| 2003/0013513 | A1 | 1/2003 | Rowe | |
| 2003/0013516 | A1 | 1/2003 | Walker et al. | |
| 2003/0013527 | A1 | 1/2003 | Rowe et al. | |
| 2003/0027631 | A1 | 2/2003 | Hedrick et al. | |
| 2003/0027632 | A1 | 2/2003 | Sines | |
| 2003/0032474 | A1 | 2/2003 | Kaminkow | |
| 2003/0032485 | A1 | 2/2003 | Cockerille | |
| 2003/0036425 | A1 | 2/2003 | Kaminkow et al. | |

(56) References Cited

U.S. PATENT DOCUMENTS

| | | | |
|---|---|---|---|
| 2003/0045354 | A1 | 3/2003 | Giobbi |
| 2003/0054868 | A1 | 3/2003 | Paulsen et al. |
| 2003/0054880 | A1 | 3/2003 | Lam et al. |
| 2003/0054881 | A1 | 3/2003 | Hedrick et al. |
| 2003/0064800 | A1 | 4/2003 | Jackson et al. |
| 2003/0064805 | A1 | 4/2003 | Wells |
| 2003/0069074 | A1 | 4/2003 | Jackson |
| 2003/0074259 | A1 | 4/2003 | Slyman, Jr. |
| 2003/0083126 | A1 | 5/2003 | Paulsen |
| 2003/0083943 | A1 | 5/2003 | Adams et al. |
| 2003/0092477 | A1 | 5/2003 | Luciano, Jr. |
| 2003/0096645 | A1 | 5/2003 | Soltys et al. |
| 2003/0100359 | A1 | 5/2003 | Loose et al. |
| 2003/0100371 | A1 | 5/2003 | Gatto et al. |
| 2003/0100372 | A1 | 5/2003 | Gatto et al. |
| 2003/0104865 | A1 | 6/2003 | Itkis |
| 2003/0119579 | A1 | 6/2003 | Walker et al. |
| 2003/0125101 | A1 | 7/2003 | Campo |
| 2003/0139214 | A1 | 7/2003 | Wolf et al. |
| 2003/0141359 | A1 | 7/2003 | Dymovsky |
| 2003/0144052 | A1 | 7/2003 | Walker |
| 2003/0148812 | A1 | 8/2003 | Paulsen |
| 2003/0149619 | A1 | 8/2003 | Stanley et al. |
| 2003/0162588 | A1 | 8/2003 | Brosnan et al. |
| 2003/0162591 | A1 | 8/2003 | Nguyen |
| 2003/0172037 | A1 | 9/2003 | Jung |
| 2003/0181231 | A1 | 9/2003 | Vancura et al. |
| 2003/0186734 | A1 | 10/2003 | LeMay et al. |
| 2003/0186739 | A1 | 10/2003 | Paulsen |
| 2003/0187736 | A1 | 10/2003 | Teague et al. |
| 2003/0193136 | A1 | 10/2003 | Walker et al. |
| 2003/0195036 | A1 | 10/2003 | Poole et al. |
| 2003/0199321 | A1 | 10/2003 | Williams |
| 2003/0203756 | A1 | 10/2003 | Jackson |
| 2003/0207711 | A1 | 11/2003 | Rowe |
| 2003/0211884 | A1 | 11/2003 | Gauselmann |
| 2003/0216166 | A1 | 11/2003 | Baerlocher et al. |
| 2003/0216169 | A1 | 11/2003 | Walker et al. |
| 2003/0216966 | A1 | 11/2003 | Saenz et al. |
| 2003/0224852 | A1 | 12/2003 | Walker |
| 2003/0228900 | A1 | 12/2003 | Yamagishi |
| 2003/0232647 | A1 | 12/2003 | Moser |
| 2003/0236116 | A1 | 12/2003 | Marks et al. |
| 2004/0014514 | A1 | 1/2004 | Yacenda |
| 2004/0016797 | A1 | 1/2004 | Jones |
| 2004/0023721 | A1 | 2/2004 | Giobbi |
| 2004/0024608 | A1 | 2/2004 | Saenz et al. |
| 2004/0032086 | A1 | 2/2004 | Barragan |
| 2004/0038735 | A1 | 2/2004 | Steil |
| 2004/0039635 | A1 | 2/2004 | Linde |
| 2004/0039679 | A1 | 2/2004 | Norton et al. |
| 2004/0039695 | A1 | 2/2004 | Rowe |
| 2004/0043814 | A1 | 3/2004 | Angell et al. |
| 2004/0048644 | A1 | 3/2004 | Gerrard et al. |
| 2004/0053663 | A1 | 3/2004 | Paulsen |
| 2004/0077408 | A1 | 4/2004 | D'Amico et al. |
| 2004/0085293 | A1 | 5/2004 | Soper |
| 2004/0092303 | A1 | 5/2004 | George et al. |
| 2004/0092315 | A1 | 5/2004 | Boyd et al. |
| 2004/0106449 | A1 | 6/2004 | Walker et al. |
| 2004/0106454 | A1 | 6/2004 | Walker |
| 2004/0113360 | A1 | 6/2004 | George et al. |
| 2004/0127277 | A1 | 7/2004 | Walker |
| 2004/0127284 | A1 | 7/2004 | Walker et al. |
| 2004/0129773 | A1 | 7/2004 | Lute, Jr. |
| 2004/0132531 | A1 | 7/2004 | George et al. |
| 2004/0132532 | A1 | 7/2004 | Brosnan et al. |
| 2004/0142739 | A1 | 7/2004 | Loose et al. |
| 2004/0143496 | A1 | 7/2004 | Saenz |
| 2004/0147314 | A1 | 7/2004 | LeMay |
| 2004/0152509 | A1 | 8/2004 | Hornik et al. |
| 2004/0185935 | A1 | 9/2004 | Yamagishi |
| 2004/0190042 | A1 | 9/2004 | Ferlitsch |
| 2004/0192434 | A1 | 9/2004 | Walker |
| 2004/0199284 | A1 | 10/2004 | Hara |
| 2004/0209674 | A1 | 10/2004 | Conover et al. |
| 2004/0209690 | A1 | 10/2004 | Bruzzese |
| 2004/0214622 | A1 | 10/2004 | Atkinson |
| 2004/0219975 | A1 | 11/2004 | Soltys et al. |
| 2004/0225565 | A1 | 11/2004 | Selman |
| 2004/0254006 | A1 | 12/2004 | Lam et al. |
| 2004/0254009 | A1 | 12/2004 | D'Amico et al. |
| 2004/0254013 | A1 | 12/2004 | Quraishi et al. |
| 2004/0254014 | A1 | 12/2004 | Quraishi et al. |
| 2004/0259640 | A1 | 12/2004 | Gentles |
| 2004/0266395 | A1 | 12/2004 | Pailles |
| 2004/0266516 | A1 | 12/2004 | Thomas |
| 2004/0266517 | A1 | 12/2004 | Bleich et al. |
| 2005/0003890 | A1 | 1/2005 | Hedrick et al. |
| 2005/0009600 | A1 | 1/2005 | Rowe et al. |
| 2005/0013527 | A1 | 1/2005 | Doyle et al. |
| 2005/0014554 | A1 | 1/2005 | Walker |
| 2005/0014558 | A1 | 1/2005 | Estey |
| 2005/0020354 | A1 | 1/2005 | Nguyen |
| 2005/0027381 | A1 | 2/2005 | George et al. |
| 2005/0032575 | A1 | 2/2005 | Goforth et al. |
| 2005/0037837 | A1 | 2/2005 | Rowe |
| 2005/0049049 | A1 | 3/2005 | Griswold |
| 2005/0054438 | A1 | 3/2005 | Rothschild |
| 2005/0054439 | A1 | 3/2005 | Rowe et al. |
| 2005/0054446 | A1 | 3/2005 | Kammler et al. |
| 2005/0059449 | A1 | 3/2005 | Yarbrough |
| 2005/0059457 | A1 | 3/2005 | Rothschild et al. |
| 2005/0059466 | A1 | 3/2005 | Yarbrough |
| 2005/0059480 | A1 | 3/2005 | Soukup et al. |
| 2005/0059485 | A1 | 3/2005 | Paulsen et al. |
| 2005/0070257 | A1 | 3/2005 | Saarinen |
| 2005/0075165 | A1 | 4/2005 | George et al. |
| 2005/0075889 | A1 | 4/2005 | Gomes et al. |
| 2005/0076242 | A1 | 4/2005 | Breuer |
| 2005/0085300 | A1 | 4/2005 | Johnson |
| 2005/0096112 | A1 | 5/2005 | Guinn, Jr. et al. |
| 2005/0096129 | A1 | 5/2005 | Walker et al. |
| 2005/0101383 | A1 | 5/2005 | Wells |
| 2005/0101387 | A1 | 5/2005 | Wolf |
| 2005/0119044 | A1 | 6/2005 | Lim et al. |
| 2005/0119048 | A1 | 6/2005 | Soltys et al. |
| 2005/0119052 | A1 | 6/2005 | Russell et al. |
| 2005/0130728 | A1 | 6/2005 | Nguyen |
| 2005/0130731 | A1 | 6/2005 | Englman et al. |
| 2005/0137011 | A1 | 6/2005 | Walker et al. |
| 2005/0143166 | A1 | 6/2005 | Walker et al. |
| 2005/0153768 | A1 | 7/2005 | Paulsen |
| 2005/0153773 | A1 | 7/2005 | Nguyen et al. |
| 2005/0170883 | A1 | 8/2005 | Muskin |
| 2005/0170892 | A1 | 8/2005 | Atkinson |
| 2005/0171808 | A1 | 8/2005 | Saenz et al. |
| 2005/0182647 | A1 | 8/2005 | Saenz et al. |
| 2005/0187012 | A1 | 8/2005 | Walker et al. |
| 2005/0197183 | A1 | 9/2005 | Walker et al. |
| 2005/0215310 | A1 | 9/2005 | Boyd et al. |
| 2005/0215314 | A1 | 9/2005 | Schneider et al. |
| 2005/0215316 | A1 | 9/2005 | Rowe et al. |
| 2005/0227770 | A1 | 10/2005 | Papulov |
| 2005/0240484 | A1 | 10/2005 | Yan |
| 2005/0255911 | A1 | 11/2005 | Nguyen |
| 2005/0287852 | A1 | 12/2005 | Sugawara |
| 2006/0018450 | A1 | 1/2006 | Sandberg-Diment |
| 2006/0019747 | A1 | 1/2006 | Loose et al. |
| 2006/0025195 | A1 | 2/2006 | Pennington et al. |
| 2006/0025198 | A1 | 2/2006 | Gail et al. |
| 2006/0025199 | A1 | 2/2006 | Harkins et al. |
| 2006/0025206 | A1 | 2/2006 | Walker et al. |
| 2006/0025222 | A1 | 2/2006 | Sekine |
| 2006/0030403 | A1 | 2/2006 | Lafky et al. |
| 2006/0035694 | A1 | 2/2006 | Fuller |
| 2006/0035696 | A1 | 2/2006 | Walker et al. |
| 2006/0035707 | A1 | 2/2006 | Nguyen |
| 2006/0040732 | A1 | 2/2006 | Baerlocher et al. |
| 2006/0040733 | A1 | 2/2006 | Baerlocher et al. |
| 2006/0040734 | A1 | 2/2006 | Baerlocher et al. |
| 2006/0040736 | A1 | 2/2006 | Baerlocher et al. |
| 2006/0040741 | A1 | 2/2006 | Griswold |
| 2006/0046819 | A1 | 3/2006 | Nguyen et al. |

(56) References Cited

U.S. PATENT DOCUMENTS

2006/0046823 A1 3/2006 Kaminkow
2006/0046834 A1 3/2006 Sekine
2006/0046842 A1 3/2006 Mattice
2006/0046855 A1 3/2006 Nguyen
2006/0049624 A1 3/2006 Brosnan
2006/0068906 A1 3/2006 Morrow et al.
2006/0073870 A1 4/2006 Cannon
2006/0079309 A1 4/2006 Walker et al.
2006/0079333 A1 4/2006 Morrow
2006/0084488 A1 4/2006 Kinsley et al.
2006/0089174 A1 4/2006 Twerdahl
2006/0089194 A1 4/2006 Joshi et al.
2006/0135230 A1 6/2006 Godse et al.
2006/0135255 A1 6/2006 Roth
2006/0154719 A1 7/2006 Okuniewicz
2006/0154720 A1* 7/2006 Okuniewicz ............ G07F 17/32 463/25
2006/0154721 A1 7/2006 Okuniewicz
2006/0160620 A1 7/2006 Matthews et al.
2006/0160621 A1 7/2006 Rowe
2006/0165060 A1 7/2006 Dua
2006/0166732 A1 7/2006 Lechner
2006/0166741 A1 7/2006 Boyd
2006/0173781 A1 8/2006 Donner
2006/0178203 A1 8/2006 Hughes et al.
2006/0178208 A1 8/2006 Cole
2006/0183535 A1 8/2006 Marks et al.
2006/0189382 A1 8/2006 Muir
2006/0211477 A1 9/2006 Walker et al.
2006/0223627 A1 10/2006 Nozaki
2006/0226598 A1 10/2006 Walker
2006/0246981 A1 11/2006 Walker
2006/0247027 A1 11/2006 Walker et al.
2006/0247037 A1 11/2006 Park
2006/0252504 A1 11/2006 Walker et al.
2006/0252505 A1 11/2006 Walker et al.
2006/0266598 A1 11/2006 Baumgartner
2006/0271433 A1 11/2006 Hughes
2006/0279781 A1 12/2006 Kaneko
2006/0281554 A1 12/2006 Gatto
2006/0287063 A1 12/2006 Walker et al.
2006/0287072 A1 12/2006 Walker
2006/0287098 A1 12/2006 Morrow
2007/0015569 A1 1/2007 Norton et al.
2007/0017979 A1 1/2007 Wu
2007/0021198 A1 1/2007 Muir
2007/0054733 A1 3/2007 Baerlocher et al.
2007/0060271 A1 3/2007 Cregan et al.
2007/0060292 A1 3/2007 Peterson
2007/0060297 A1 3/2007 Hein et al.
2007/0060302 A1 3/2007 Fabbri
2007/0060314 A1 3/2007 Baerlocher et al.
2007/0060321 A1 3/2007 Vasquez et al.
2007/0060372 A1 3/2007 Yamagishi
2007/0077979 A1 4/2007 Cohn et al.
2007/0087818 A1* 4/2007 Walker .................... G07F 17/32 463/25
2007/0105617 A1 5/2007 Walker et al.
2007/0105619 A1 5/2007 Kniestead et al.
2007/0117608 A1 5/2007 Roper
2007/0117623 A1 5/2007 Nelson
2007/0121936 A1 5/2007 Guillou et al.
2007/0129131 A1 6/2007 Kaminkow et al.
2007/0129137 A1 6/2007 Walker et al.
2007/0129150 A1 6/2007 Crowder
2007/0129151 A1 6/2007 Crowder
2007/0155469 A1 7/2007 Johnson
2007/0155472 A1 7/2007 Gail et al.
2007/0159301 A1 7/2007 Hirt
2007/0167208 A1 7/2007 Acres
2007/0174809 A1 7/2007 Brown
2007/0184887 A1 8/2007 Cannon
2007/0190494 A1 8/2007 Rosenberg
2007/0191088 A1 8/2007 Breckner et al.
2007/0202941 A1 8/2007 Miltenberger
2007/0213124 A1 9/2007 Walker et al.
2007/0218971 A1 9/2007 Berube
2007/0218975 A1 9/2007 Iddings et al.
2007/0218982 A1 9/2007 Baerlocher et al.
2007/0218985 A1 9/2007 Okada
2007/0218991 A1 9/2007 Okada
2007/0238505 A1 10/2007 Okada
2007/0259709 A1 11/2007 Kelly et al.
2007/0259711 A1 11/2007 Thomas
2007/0265060 A1 11/2007 Hornik et al.
2007/0298874 A1 12/2007 Baerlocher et al.
2007/0298875 A1 12/2007 Baerlocher et al.
2008/0009344 A1 1/2008 Graham et al.
2008/0020830 A1 1/2008 Ikehara et al.
2008/0020831 A1 1/2008 Ikehara et al.
2008/0026816 A1 1/2008 Sammon et al.
2008/0026823 A1 1/2008 Wolf
2008/0026844 A1 1/2008 Wells
2008/0032801 A1* 2/2008 Brunet de Courssou ............................... G07F 17/32 463/42
2008/0039190 A1 2/2008 Walker et al.
2008/0070671 A1 3/2008 Okada
2008/0076528 A1 3/2008 Nguyen
2008/0076572 A1 3/2008 Nguyen
2008/0085753 A1 4/2008 Okada
2008/0113765 A1 5/2008 DeWaal
2008/0123026 A1 5/2008 Kwag
2008/0139306 A1 6/2008 Lutnick
2008/0166997 A1 7/2008 Sun
2008/0182644 A1 7/2008 Lutnick
2008/0200251 A1 8/2008 Alderucci
2008/0207296 A1 8/2008 Lutnick
2008/0213026 A1 9/2008 Grabiec
2008/0214263 A1 9/2008 Walker et al.
2008/0234028 A1 9/2008 Meyer
2008/0261682 A1 10/2008 Phillips
2008/0268934 A1 10/2008 Mattice
2008/0270302 A1 10/2008 Beenau
2008/0293483 A1 11/2008 Pickus
2008/0300051 A1 12/2008 Walker et al.
2008/0305862 A1 12/2008 Walker
2008/0311971 A1 12/2008 Dean
2008/0318655 A1 12/2008 Davies
2009/0023490 A1 1/2009 Moshal
2009/0054149 A1 2/2009 Brosnan
2009/0125429 A1 5/2009 Takayama
2009/0197684 A1 8/2009 Arezina
2009/0291736 A1 11/2009 Walker et al.
2010/0174650 A1 7/2010 Nonaka
2010/0219234 A1 9/2010 Forbes
2010/0227670 A1 9/2010 Arezina
2010/0234099 A1 9/2010 Rasmussen
2011/0098104 A1 4/2011 Meyerhofer
2012/0129611 A1 5/2012 Rasmussen
2014/0221099 A1 8/2014 Johnson et al.

FOREIGN PATENT DOCUMENTS

EP 0946028 9/1999
EP 1255234 6/2002
GB 1 559 496 1/1980
GB 2 374 294 10/2002
JP 8000829 1/1996
JP 2001276438 10/2001
JP 2002197058 7/2002
WO WO 00/32286 6/2000
WO WO 00/67424 11/2000
WO WO 02/21467 3/2002
WO WO 02/45808 6/2002
WO WO 02/055163 7/2002
WO WO 02/073501 9/2002
WO WO 02/097749 12/2002

(56) References Cited

FOREIGN PATENT DOCUMENTS

| | | |
|---|---|---|
| WO | WO 03/089082 | 10/2003 |
| WO | WO 03/093986 | 11/2003 |

OTHER PUBLICATIONS

Terry Lefton, "Playing the Ad Market," The Industry Standard, Jul. 30, 2001.
Daisy Whitney, "A TiVo-Proof Ad Model," Vision Week, May 7, 2004.
Curtis Rist, "Should your ad go here?," http://money.cnn.com/2004/03/04/technology/business2.
Jack Myers, "Outdoor Sets Sites on Doubling Share-of-Market with Research & Tech Upgrades," Jack Myers Report, Mar. 3, 2004.

* cited by examiner

METHOD AND APPARATUS FOR PROVIDING SECONDARY GAMING MACHINE FUNCTIONALITY

PRIORITY CLAIM

This application is a continuation application of, claims the benefit of and priority to U.S. patent application Ser. No. 13/964,242, filed on Aug. 12, 2013, which is a continuation application of, claims the benefit of and priority to U.S. patent application Ser. No. 11/897,532, filed on Aug. 30, 2007, now U.S. Pat. No. 8,512,144, which is a continuation-in-part application of, claims the benefit of and priority to U.S. patent application Ser. No. 11/686,755, filed on Mar. 15, 2007, which is a continuation-in-part application of, claims the benefit of and priority to U.S. patent application Ser. No. 11/468,946, filed on Aug. 31, 2006, which is a continuation-in-part application of, claims the benefit of and priority to U.S. patent application Ser. No. 10/689,407, filed on Oct. 20, 2003, now U.S. Pat. No. 7,335,106, the entire contents of which are each incorporated by reference herein.

FIELD OF THE INVENTION

The present invention relates to gaming machines.

BACKGROUND OF THE INVENTION

Wager-based gaming continues to grow in popularity. In order to attract players, casinos and gaming device manufacturers continuously seek to develop new games and other amusing or entertaining events. In this regard, gaming device manufacturers develop and release hundreds of new wagering games each year. Some gaming devices present entirely new games. Other gaming devices may present old games, but may utilize new entertaining themes.

Generally, gaming machines are custom configured to present one or more particular games. For example, International Game Technology's "Wheel of Fortune" gaming machine presents only a single game, and has a custom façade and other elements specifically directed to that game. Even other gaming machines, such as those presenting video poker games are generally configured to present only one or more specific games.

Unfortunately, these gaming machines often cost $10,000 or more per unit. As such, it is difficult to replace the machines in a short life cycle, such as to present new or different games or games with different themes. As a result, casinos may not be able to afford to maintain a stock of machines presenting the latest, most exciting games, or machines having the newest and most exciting features.

It would be beneficial for gaming device manufacturers and casinos to have a more economical way to introduce new games and other gaming device features.

SUMMARY OF THE INVENTION

One aspect of the invention is a gaming machine configured to provide primary gaming functionality and additional or secondary functionality. One embodiment of the invention is a modified gaming machine configured to provide such functionality. Another embodiment of the invention is a method of modifying an existing gaming machine to provide such functionality.

In one embodiment, a modified gaming machine comprises a plurality of gaming machine peripheral devices for use in implementing one or more games to a player, a master gaming controller configured to implement primary gaming machine functionality, the master gaming controller configured to generate and transmit information to the plurality of gaming machine peripherals. The modified gaming machine further comprises a secondary controller. Preferably, the secondary controller is interposed between one or more of the plurality of gaming machine peripheral devices and the master gaming controller, whereby the secondary controller may forward information generated by the master gaming controller to the gaming machine peripheral devices and transmit secondary information to the peripheral devices.

In one embodiment, the secondary controller is interposed between the input/output ports of the master gaming controller and a printer, touch screen and video display of the gaming machine. The secondary controller is preferably configured to receive information from one or more secondary or outside sources, such as one or more servers. Such information may comprise a video feed, advertising or promotional information, wagering game information or the like.

The gaming machine may also include one or more sensors or other secondary devices, such as internal and/or external temperature sensors, air flow sensors, power sensors, ground sensors or the like. Such sensors may be placed in communication with the secondary controller, whereby additional functionality is enabled at an existing gaming machine.

Another embodiment of the invention is a method of modifying an existing gaming machine having peripheral devices in communication with a master gaming controller. In accordance with the method, a secondary controller is interposed between the master gaming controller and one or more of the peripheral devices. This may comprise severing an existing communication link between the master gaming controller and a peripheral, and forming a new first communication link between the input/output port corresponding to the master gaming controller and the secondary controller, and a second communication link between the secondary controller and the peripheral device.

In accordance with the invention, various secondary functionality may be enabled at a gaming machine. Such functionality may be the presentation of advertising, video or other streaming media (such as television or movies), player promotions, wagering events other than those which the gaming machine is configured to offer in its base configuration, and gaming machine and player monitoring functions, among others. Preferably, such secondary functionality is enabled by a secondary controller which does not modify or alter the master gaming controller, but which instead communicates with the peripherals of the gaming machine.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a method and apparatus for modifying an existing gaming machine to provide additional or secondary functionality. In general, a secondary controller is interposed between a gaming machine's master gaming controller and one or more peripheral components thereof. The secondary controller permits the implementation of secondary gaming and entertainment functions, as well as secondary gaming machine operation or control functions.

Figure 1:
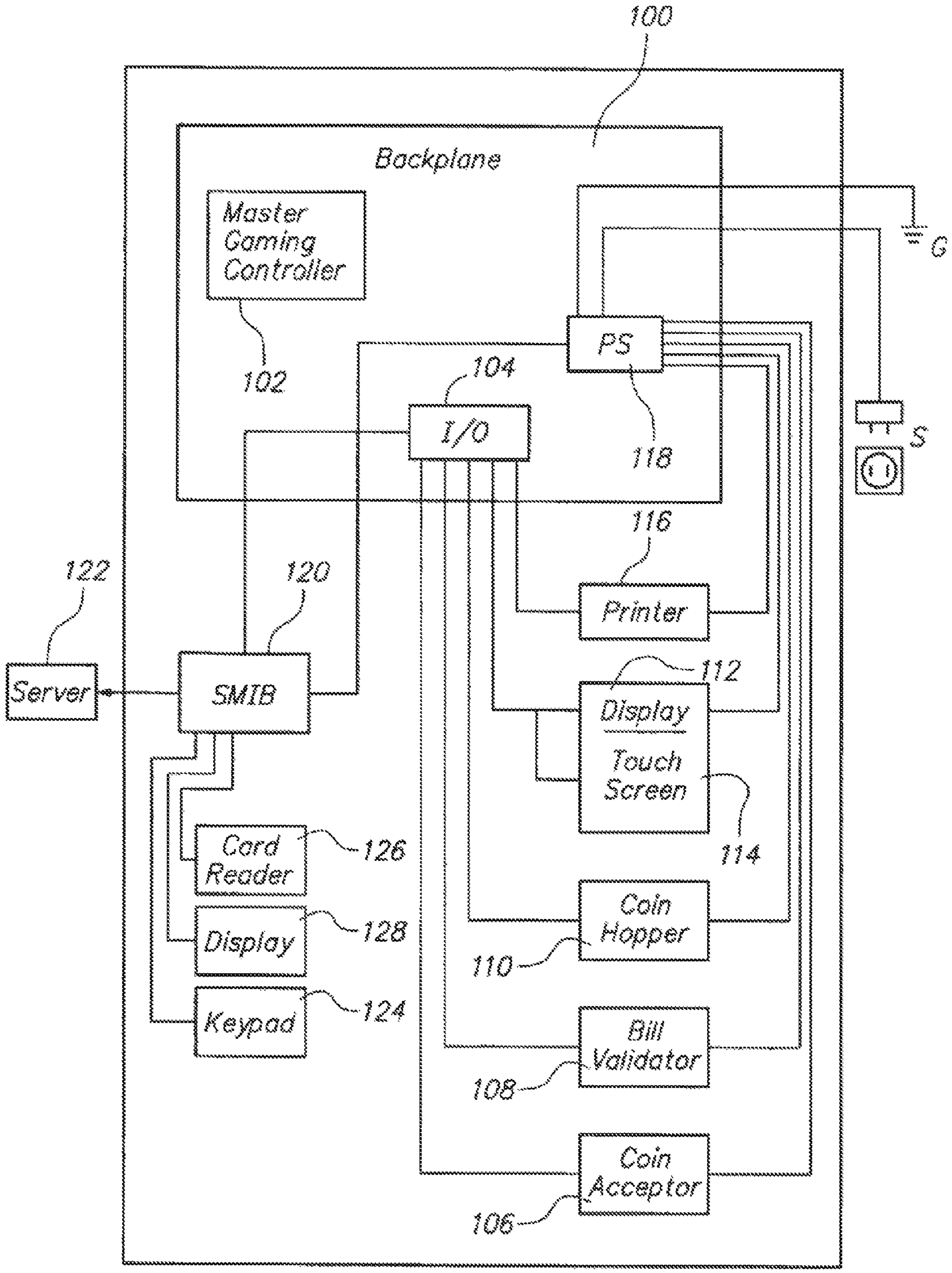
FIG. 1 (Prior Art)
FIG. 1 is a schematic diagram of a gaming machine configured in accordance with the prior art.

FIG. 1 illustrates a gaming machine configured in accordance with the prior art. FIG. 1 illustrates various of the electronic or electronically controlled components of the gaming machine. It will be understood that these components may be located within or be supported by a housing or cabinet. The gaming machine may also include a variety of other components.

The prior art gaming machine includes a backplane 100 for supporting and connecting various components. A master gaming controller 102 is connected to the backplane 100. The master gaming controller 102 may comprise a computer processing unit and may include one or more associated components, such as memory devices or the like. In general, the master gaming controller 102 is configured to execute machine readable code for use in operating the gaming device. For example, the master gaming controller 102 may generate signals used to control various components of the gaming machine and/or generate data for use by those components.

An input/output (I/O) board 104 is associated with the master gaming controller 102. The I/O board 104 may be part of the master gaming controller 102 or, as illustrated in FIG. 1, be connected to the backplane 100. The input/output board 104 may include various connectors or communication ports for use in connecting various components to the master gaming controller 102 (whereby the master gaming controller 102 may provide information, to the components, and/or receive information from those components). As used herein, the information or data may have any of a variety of forms now known or later developed, whether analog or digital, on/off, numeric, wave form or having any other configuration. The input/output board 104 may, for example, include one or more serial (such as RS-232), parallel, USB, Firewire® or other types of connections.

The gaming machine may include a variety of peripheral devices for use in presenting games to a player. For example, the gaming machine may include: a coin acceptor 106 for accepting coins for one or more wagers; a bill validator 108 for accepting paper currency, tickets or other printed documents representing value for one or more wagers; a coin hopper 110 for storing received coins and from which coin payouts may be paid; at least one display 112 for displaying game information, which display may have an associated touch screen 114 for receiving player touch input, and a printer 116 for printing tickets or other media. Of course, the gaming machine might have a wide variety of peripherals or other components, including buttons, rotatable arms, joysticks, trackballs, speakers and other devices.

As illustrated, each of these peripheral devices preferably communicates with the master gaming controller 102 via a communication connection through the I/O board 104 associated with the backplane 100. The particular connection might vary. For example, the printer 116 might be a USB-type device and thus interface with the I/O board 104 via a USB connection and associated port. The coin hopper 110, however, might be an RS-232 type device and connect to the I/O board 104 via a 9 pin connector. Preferably, the master gaming controller 102 can control these various peripheral devices via the communication connections therewith.

The various electrical or electro-mechanical devices of the gaming machine are powered. As illustrated, a power supply 118 may be associated with the backplane 100. The power supply 118 preferably connects to a ground G and an external power source S. The power supply 118 preferably provides power to the master gaming controller 102 and the various peripheral devices of the gaming machine, as illustrated.

In one embodiment, the gaming machine may be configured to implement gaming machine accounting and player tracking functions. These operations may be facilitated by a Slot Machine Interface Board or "SMIB" 120. As illustrated, the SMIB 120 may connect to the master gaming controller 102 via the backplane 100, and may communicate with an external server 122 via a communication link. In one prior art configuration, the gaming machine may utilize a Slot Accounting Standard or "SAS" protocol in order to implement various gaming machine accounting functions (such as tracking of wagers, game wins and other information, as is known in the art). Due to the interface with the external server, the gaming machine accounting information may be obtained or tracked externally to the machine.

In addition, the gaming machine may include a player tracking feature. The player tracking feature may be implemented via components such as a keypad 124, a card reader 126 for reading cards or other media, other peripheral devices, such as a display 128. The player tracking devices or components may interface with the SMIB 120, and thus with the external server 122. In this manner, information regarding a particular player's play may be tracked. For example, a player may insert a player card having player identification information associated therewith, and that information may be provided to the server 122. Thereafter, game play information may be provided to the server 122, as known to be associated with the particular player identified by the provided identification information.

As just described, the gaming machine is a fully integrated and pre-configured device for presenting one or more wagering games to a player. As indicated above, however, such a gaming machine has a number of drawbacks owing to the specific configuration of the device.

In a preferred embodiment of the present invention, a secondary controller or secondary function control unit (SFCU) is provided which, when associated with a gaming machine, permits the gaming machine to provide additional or secondary functionality from its basic or pre-configured functionality. In one embodiment, the SFCU is particularly suited to use with an existing gaming machine, including a gaming machine pre-configured in the manner illustrated in FIG. 1 and described above, or in a manner similar thereto.

The SFCU, its method of use, its association with a gaming machine and system of the invention, will now be described first with reference to FIG. 2. In this figure, the SFCU 200 is shown in association with a gaming machine configured as illustrated in FIG. 1. As such, the above-described components have been given like reference numbers.

The SFCU 200 preferably comprises hardware, such as one or more circuit boards. The SFCU 200 may comprise software, such as machine readable code. Such software, however, may be implemented as hardware.

In one embodiment, the SFCU 200 is configured to communicate with one or more components of a gaming machine. As such, the SFCU 200 includes one or more ports via which communication links may be established between the SFCU 200 and those components. Referring to FIG. 2, in one embodiment, the SFCU 200 is interposed between various of the components of the gaming machine and the I/O board 104, and thus the master gaming controller 102 (which receives information or signals from the I/O board 104 and provides information or signals to the I/O board 104). In this manner, the SFCU 200 can monitor or override instructions or data provided to those components by the master gaming controller 102 and monitor or override instructions or data provided by those components and intended for the master gaming controller 102.

As illustrated, the SFCU 200 is interposed between the I/O board 104 and the printer 116, the I/O board 104 and the display 112, and the I/O board 104 and the touch screen 114. The SFCU 200 may be interposed between the I/O board 104 and other of the components. A first communication link C1 is provided between the SFCU 200 and the I/O board 104. A second communication link C2 is provided between the SFCU 200 and the printer 116. In combination, these communication links C1 and C2 permit the master gaming controller 102 to still communicate with the printer 116 through the SFCU 200 (preferably as controlled or monitored by the SFCU 200). In addition, however, this configuration permits the SFCU 200 to communicate directly with the printer 116.

Similarly, a first communication link C3 is provided between the SFCU 200 and the I/O board 104. A second communication link C4 is provided between the SFCU 200 and the display 112. In combination, these communication links C3 and C4 permit the master gaming controller 102 to still communicate with the display 112 through the SFCU 200 (preferably as controlled or monitored by the SFCU 200). In addition, this configuration permits the SFCU 200 to communicate directly with the display 112.

A first communication link C5 is provided between the SFCU 200 and the I/O board 104. A second communication link C6 is provided between the SFCU 200 and the touch screen 114. In combination, these communication links C5 and C6 permit the master gaming controller 102 to still communicate with the touch screen 114 though the SFCU 200 (preferably as controlled or monitored by the SFCU). In addition, this configuration permits the SFCU 200 to communicate directly with the touch screen 114.

It will be appreciated that the communication protocols utilized between the various components and the configuration of the communication ports and links may vary dependent primarily upon the configuration of the components. For example, if the printer 116 is configured as a USB type device, a USB communication protocol and associated ports may be utilized. In other embodiments, parallel, serial or other communication protocols and configurations may be utilized. The communication links may be wired or wireless.

In one embodiment, a communication link C7 is provided between the SFCU 200 and the I/O board 104. In a preferred configuration, the communication link C7 is established between the SFCU 200 and a secondary SAS port of the master gaming controller 102. In particular, one common configuration for the master gaming controller 102 is to have two communication ports through which communications may be established using the SAS protocol. As indicated above, in a common gaming machine configuration, the master gaming controller 102 may communicate with the SMIB 120 via one of these ports, generally the "primary" port. In a preferred configuration, the SFCU 200 is connected to the master gaming controller 102 via the secondary port.

Yet another communication link C8 is provided between the SFCU 200 and at least one external device. Preferably, that device comprises at least one server 202. The SFCU 200 may transmit information over this communication link C8 to the server 202 and/or receive information over this link from the server 202. It will be appreciated that the SFCU 200 might be configured to communicate with more than one external device, such as more than one server or other sources of information, either via one or more communication links. In one embodiment, the server or servers 202 may include a game management system, a media management system and/or a feed of media content (such as television/cable).

In a preferred embodiment, the server or servers 202 performs validation/redemption functions. In such an embodiment, the server or servers 202 may communicate with one or more external SMIBs 203, which SMIBs 203 is communication with the gaming system external server 122 (which may perform host accounting and/or player tracking functions, among others). The number of external SMIBs 203 may vary, such as to ensure that a sufficient number of SMIBs exist to process transactions forwarded by the SFCU 200.

Power may be provided to the SFCU 200 from a dedicated power source or via the power source S to the gaming machine.

In this configuration, the interposition of the SFCU 200 into the gaming machine does not interfere with the normal operation of the gaming machine. In particular, the gaming machine may present one or more wagering games or other events or activities to a player, as the gaming machine was originally designed. For example, in the presentation of a game, the master gaming controller 102 generates game data for display by the display 112. This data is simply transmitted to the I/O board 104 and then along communication links C3 and C4 to the display 112, through the SFCU 200. Likewise, a player's touch input to the touch screen 114 is transmitted to the master gaming controller 102 via communication links C5 and C6 through the SFCU 200.

In accordance with the invention, however, a variety of secondary gaming machine functionality may be implemented via the SFCU 200. A variety of this functionality may relate primarily to the player's use of the machine, such as gaming and entertainment functionality. For example, in one embodiment of the present invention, casino operators may be provided with the ability to do one or more of the following:

Promote and sell a linked Keno style game such as NEVADA NUMBERS® and THE MILLION DOLLAR TICKET® directly via a gaming machine that is connected (via an SFCU 200) to an on-premise, application server 202 housing a game management system for the offered games. The SFCU 200 functions as a ticket kiosk or Keno writer station in this particular application. Of course, other secondary wagering games or other gaming events may be presented at the gaming machine via the SFCU 200.

Display customized marketing video content (such as via the gaming machine display 112). Such marketing, advertising or other promotional content may be displayed when the machine is live (i.e. during a gaming session) or when the gaming machine is idle, such as to enable the casino operator to more effectively promote and communicate to their customers via a gaming machine that otherwise was not being fully utilized. Such a function can be turned on and/or off as defined by the casino operator (i.e., auto "on" after "X" minutes of game idle-time, and "off" with a screen-touch or after a specific number of minutes). Of course, other advertising, promotional or similar information may be presented at the gaming machine via the SFCU 200.

Present TV programming (audio and video) on the gaming machine display 112 (or portion thereof) with user selectable channels. Of course, other streaming media may be provided at the gaming machine via the SFCU 200. In one embodiment, closed captioning or SAP information for such programming may be displayed at the gaming machine. Such information might be displayed as part of the window or "picture" displaying the programming, or in a separate window or ticker bar.

Other non-limiting examples of capabilities/features that could be provided in various embodiments of the present invention include one or more of the following:

Providing the ability to accept other wagers and transactions that otherwise would not have been possible through the gaming machine. An example of this additional wager is a race and sports wager. To implement such a feature or functionality, the gaming machine (via the SFCU 200) acts as a kiosk terminal interfacing into existing, approved, gaming systems in operation at the casino.

Providing the ability to perform, configure and direct player specific marketing or paragaming activities to the player. In one embodiment, the SFCU 200 transmits player specific advertising or games, for example, as provided by the remote server 202. The remote server 202 may configure the advertising or games for the player based upon identification information obtained via the SMIB 120. In such an embodiment, the remote server 202 may communicate with one or more player tracking servers of the host gaming system (such communication links are not shown in FIG. 2 or 3) so as to obtain the player information.

Providing the purchase of a live Keno game and commerce/couponing capabilities.

As one non-limiting example, the apparatus and system of the invention may be configured to present a secondary game. In such an embodiment the SFCU 200 makes use of an input mechanism of the master gaming controller 102, such as the touch screen 114. Activity on the user interface is presented to a game management system residing at the external server 202.

In one embodiment, the game may involve the game management system performing standard procedures associated with writing a ticket. For example, a ticket for Keno games such as NEVADA NUMBERS® or THE MILLION DOLLAR TICKET® can be provided as though written by an approved writer station connected to a game management system. Additionally the SFCU 200 makes use of the existing printer 116 of the gaming machine to produce a valid ticket receipt. Beyond the normal approved validation and logging process typically provided by a writing station for a NEVADA NUMBERS® and THE MILLION DOLLAR TICKET® transaction, the SFCU 200 also connects to the game provider's existing slot accounting system (via remote server 202) at external accounting server 122 with its own unique asset number at the SMIB 203 to properly account for transactions.

As another non-limiting example, embodiments of the present invention may provide secondary functionality comprising advertising or other content. In providing this feature, the SFCU 200 interfaces to the gaming machine display 112 to present advertisements, information, messaging, and promotions to viewers in either a player-selected, or "screensaver" mode. This presentation can be completely "client-specific", or in other words, can be controlled by the casino operator. The content can be still-frames, animations, full-motion videos or a combination of two or more of these. This feature can permit complete control over the content as to display times, campaign start/stop dates, display schedules, and background media management functionality. Both player-selected and screensaver modes are interrupted by a screen-touch, game initiation (game buttons), or cash-in events to restore the master gaming controller 102 to the appropriate state. For example, the SFCU 200 could be used to provide the home page for a master gaming controller. The advertising or other content could be pre-loaded into a memory associated with the SFCU 200, or could be provided by the external server 202.

As another non-limiting example, the invention may be utilized to provide audio and/or video from a tuned TV station or from some other video source (including a live feed, such as from a sporting event or the like, to which an associated wagering event may be tied). The player or viewer is able to control the content being viewed by changing or selecting a channel, adjusting the volume and/or disabling the viewing via the touch screen 114. The display can be positioned and/or re-sized by the player so that it doesn't interfere with underlying game they are playing. With an RF coax feed, the full range of "in-house", client site channels are available. Other delivery feeds may restrict the viewable content to a client-selected "band" or subset of channels, provided on the RF coax feed. In order to facilitate such functionality, the SFCU 200 may include a tuner.

The SFCU 200 can be an advanced multi-media device and in a general embodiment, can interconnect with multiple video sources, such as a CATV network, through a variety of video inputs and formats, multiple data sources through a variety of data lines and multiple application servers typically attached to a LAN via an Ethernet connection or wireless encrypted 802.11xx, Bluetooth or other standards. The sources, media types and channel choices available can be based on the player's profile.

In yet other embodiments, it secondary functionality may be provided to a player based upon established entitlement. For example, a player may be required to wager a certain amount of funds or meet other criteria in order to be entitled to certain functionality. Such functionality, such as enhanced television programming (such as movie channels or the like), may be enabled by the SFCU 200 only upon such criteria being met.

Because various of the signals or information from the master gaming controller 102 pass through the SFCU 200, the SFCU 200 may be configured to: (1) pass those signals or information directly; (2) interrupt those signals or information; or (3) modify those signals or information (such as by including additional information, such as a picture-in-picture presentation).

It will be appreciated that other functionality may be implemented via the SFCU 200. In one embodiment, the secondary functionality may relate to the control and/or operation of the gaming machine, such as for the benefit of the owner or operator of the gaming machine.

Figure 2:
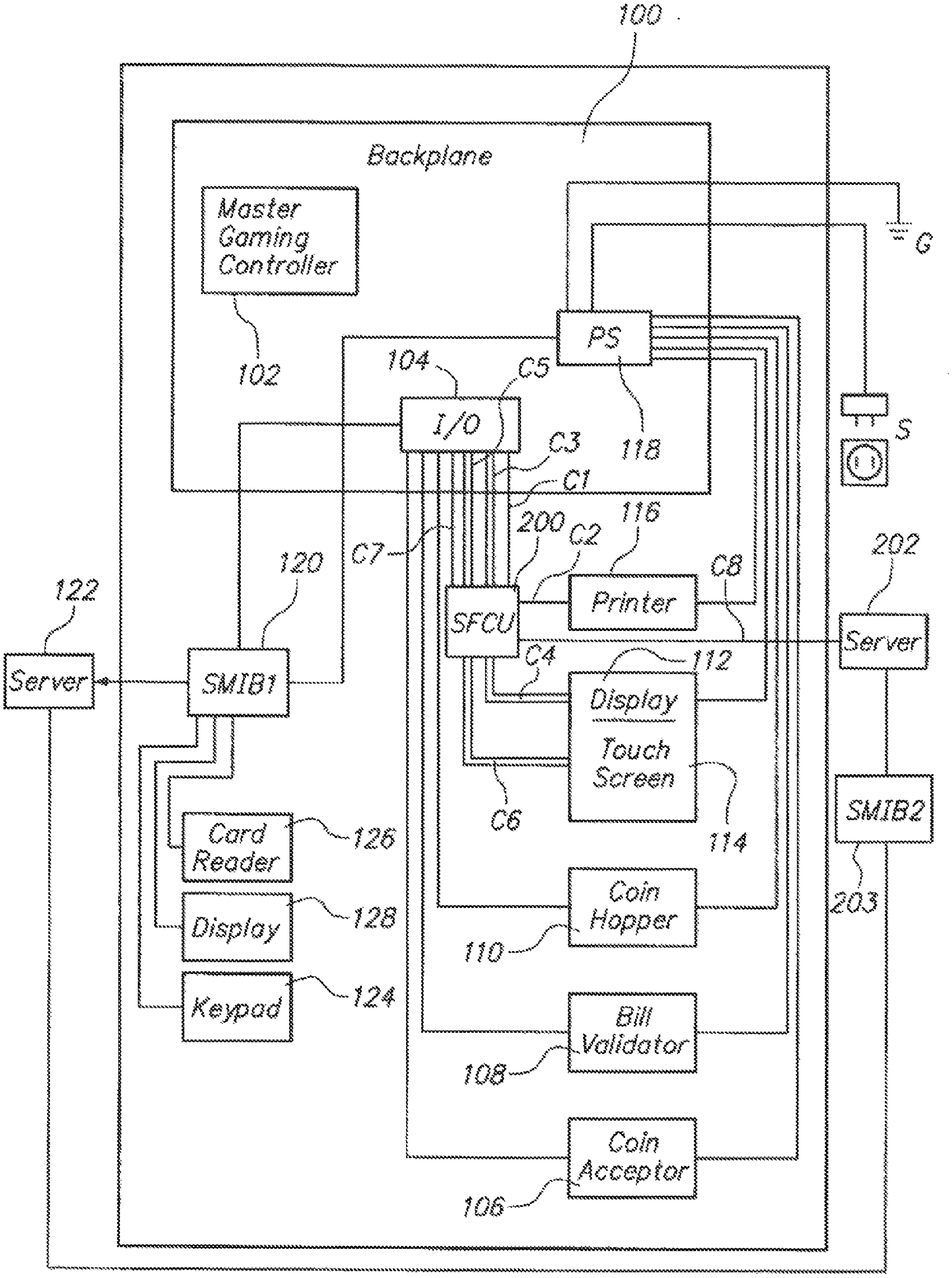
FIG. 2 is a schematic diagram of a gaming machine modified in accordance with one embodiment of the present invention.
Figure 3:
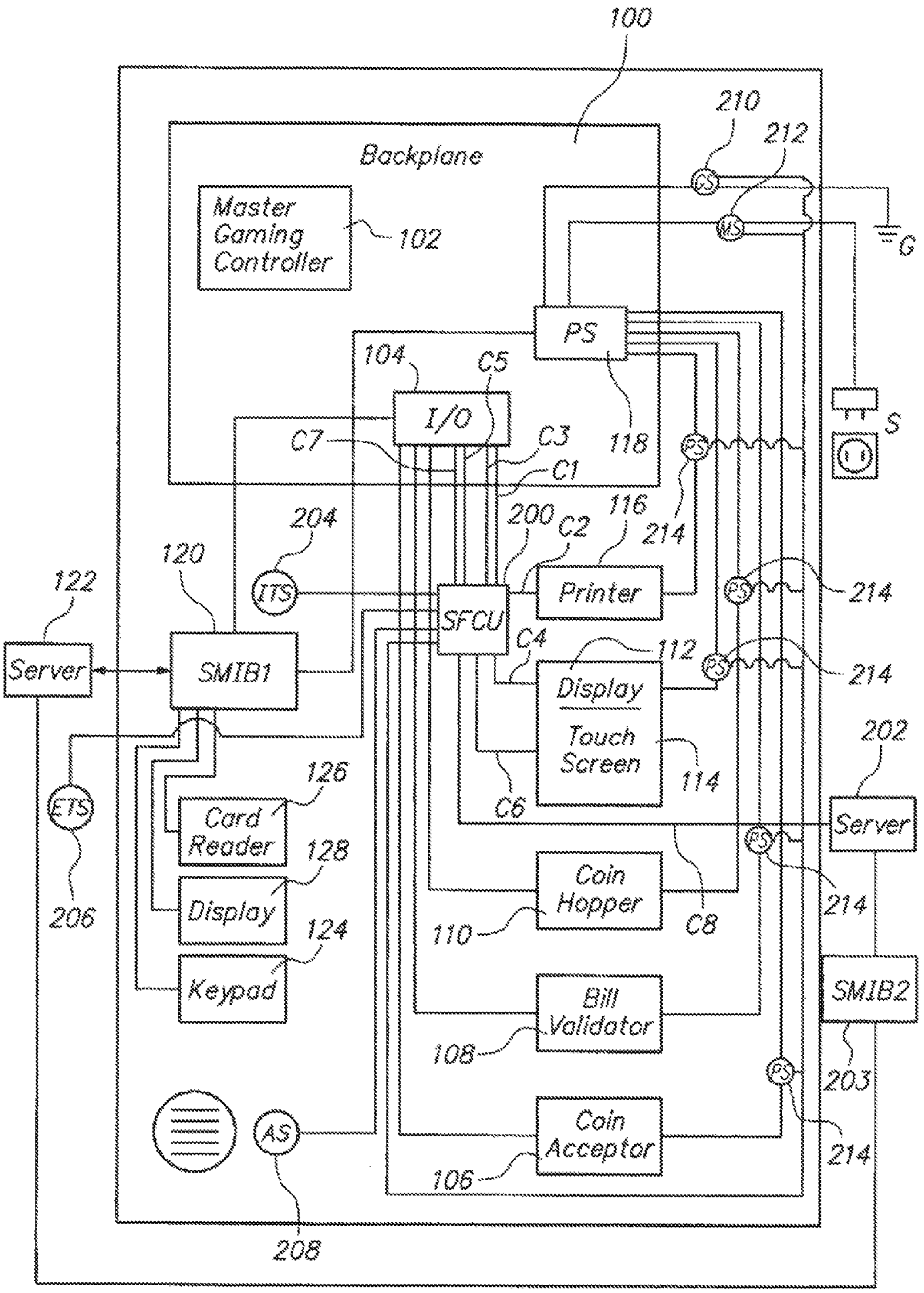
FIG. 3 is a schematic diagram of a gaming machine modified in accordance with another embodiment of the present invention.

FIG. 3 illustrates yet another embodiment of the invention. This embodiment of the invention is similar to that described above and illustrated in FIG. 2, and thus like reference numbers have been utilized to designate like components. In accordance with this embodiment, however, gaming machine monitoring functions are implemented via the SFCU 200.

In one embodiment, the SFCU 200 may monitor the temperature of the air associated with the gaming machine and/or the temperature of various components. As illustrated, at least one internal temperature sensor 204 may be provided inside one or more portions of the gaming machine. The temperature sensor 204 is preferably configured to generate a signal representative of the temperature of the air in the vicinity of the sensor. This signal is provided to the SFCU 200. In one embodiment, the SFCU 200 may implement a reporting and/or control strategy relating to the internal or interior air temperature of the gaming machine. For example, if the interior temperature becomes too high, the SFCU 200 may send an alarm signal the external server 202. Such a signal to the external server 202 might be utilized to generate an alarm or alert to the machine operator. In yet another embodiment, the SFCU 200 might be configured to interrupt operation of the gaming machine. For example, the SFCU 200 could interrupt operation of the printer 116, display 112 and touch screen 114, effectively disabling use of the machine. The SFCU 200 might cause the display 112 to display an alert to the player and operator.

Similarly, at least one exterior or outside temperature sensor 206 may be provided at one or more points external to the gaming machine. This sensor 206 may provide a signal to the SFCU 200 representative of the exterior air temperature. Again, the SFCU 200 may utilize this information in a variety of manners, such as by generating alarms or alerts or affecting the operation of the gaming machine. For example, if the exterior air temperature becomes excessively high in the area of the gaming machine, this fact may be reported to the operator via the external server. In one embodiment, the SFCU 200 might utilize the combination of the internal and external temperature sensors 204 and 206 in order to determine a temperature differential. This information may be utilized to confirm that sufficient cooling of the machine is occurring (which might reflect, for example, whether one or more air intakes or exhaust ports to the gaming machine are blocked or that air flow fans are operating).

In one embodiment, at least one air flow sensor 208 may provide a signal representative of the rate of ventilation air through the gaming machine. For example, an air flow sensor 208 may be positioned adjacent an air intake of the gaming machine. The SFCU 200 may utilize the signal or information from the air flow sensor(s) to generate alarms or alerts or affect the operation of the gaming machine, in a similar manner to that described above.

As indicated, temperature sensors might also be associated with particular components. For example, a temperature sensor might be provided in association with the master gaming controller 102. If the temperature becomes too high, an alarm or alert might be generated by the SFCU 200.

In one embodiment, the SFCU 200 may be configured to control the power supply 118 of the gaming machine. In such embodiment, the SFCU 200 might turn off power to one or more components of the gaming machine in the event of overheating.

In accordance with another embodiment of the invention, the SFCU 200 may monitor the power supply 118 and/or power provided to various components of the gaming machine. For example, a ground sensor 210 may provide a signal to the SFCU 200 representative of the status of the electrical ground G for the gaming machine. If the electrical ground G is interrupted, the ground sensor 210 may provide a signal to the SFCU 200 regarding that fact.

Likewise, a main power sensor 212 may monitor the main power supply S to the gaming machine. If the main power supply is interrupted, a signal may be provided to the SFCU 200 regarding that fact. In one embodiment, the main power sensor 212 might also measure or detect various conditions or characteristics of the power supply, such as the line voltage. Information regarding the voltage may be provided to the SFCU 200.

In addition, individual component power sensors 214 may monitor the power to individual components of the gaming machine. For example, though not limited to this configuration, component sensors 214 might be provided relative to the printer 116, display 112, touch screen 114, coin hopper 110, bill validator 108 and coin acceptor 106. These individual sensors may again provide information regarding the power provided to each component to the SFCU 200.

Again, the SFCU 200 may be configured to generate alarms or alerts or affect the operation of the gaming machine in response to information provided by the various power sensors. For example, in the event a low voltage condition is detected, the SFCU 200 might provide a signal to the external server 202. Alternatively, the SFCU 200 might be configured to interrupt the power supply 118 in order to prevent the low voltage condition from damaging the gaming machine components. For example, the SFCU 200 might be configured to trigger a main off power supply switch to shut down the gaming machine or various components thereof and thus isolate them from the detrimental power condition.

In accordance with the invention, a variety of sensors or other devices may be connected to the SFCU 200. For example, aroma or other air quality or condition sensors might be configured to provide input to the SFCU 200. One or more cameras or microphones might be connected to the SFCU 200, such as for monitoring activity at the exterior or interior of the gaming machine. Video or audio feeds might be provided through the SFCU 200 to an external security system or the like.

In one embodiment, the apparatus and system may include additional components. For example, the SFCU 200 might be configured to provide audio data to existing speakers of the gaming machine. In other embodiments, however, the SFCU 200 might include a dedicated headphone or audio port or provide audio via additional speakers.

Similarly, a gaming machine could be fitted with an additional display. For example, the SFCU 200 could be utilized with a “rotating reel” type gaming machine. In order to provide video and other data, a video display might be added to the gaming machine. The SFCU 200 would then provide information or data to that display. In this manner, for example, television or advertising content could be provided to a player of a rotating reel slot machine.

In one embodiment, one or more motion, proximity or other sensors might be associated with the SFCU 200. Such a sensor might detect, for example, the proximity of a person to the gaming machine. Upon triggering of the sensor, the SFCU 200 might be arranged to cause the gaming machine to enter an "attract" mode or otherwise display particular information or the like. For example, upon detection of a person, the SFCU 200 might cause the video display 112 of the gaming machine to display promotions, game attraction information or the like.

In one embodiment, the "proximity" sensor could be an RFID detection device for detecting RFID tags. Such tags might be associated with player tracking cards, or otherwise be provided to patrons of a casino or other location, whereby when the player is in the proximity of the machine, the player is detected. Such information might include player identification information, whereby the gaming machine can be caused to display information particularly selected for the particular player who is detected.

As indicated, the various communication links between the various components may vary, including depending upon the configuration of the particular device. For example, if the link is a wireless link, the communication protocol and associated communication port architecture may be Bluetooth or IEEE 802.11xx. For wired links, the protocol/architecture may be USB, RS-485, IEEE-1394 (Firewire®), Ethernet or TCP/IP.

Figure 4:
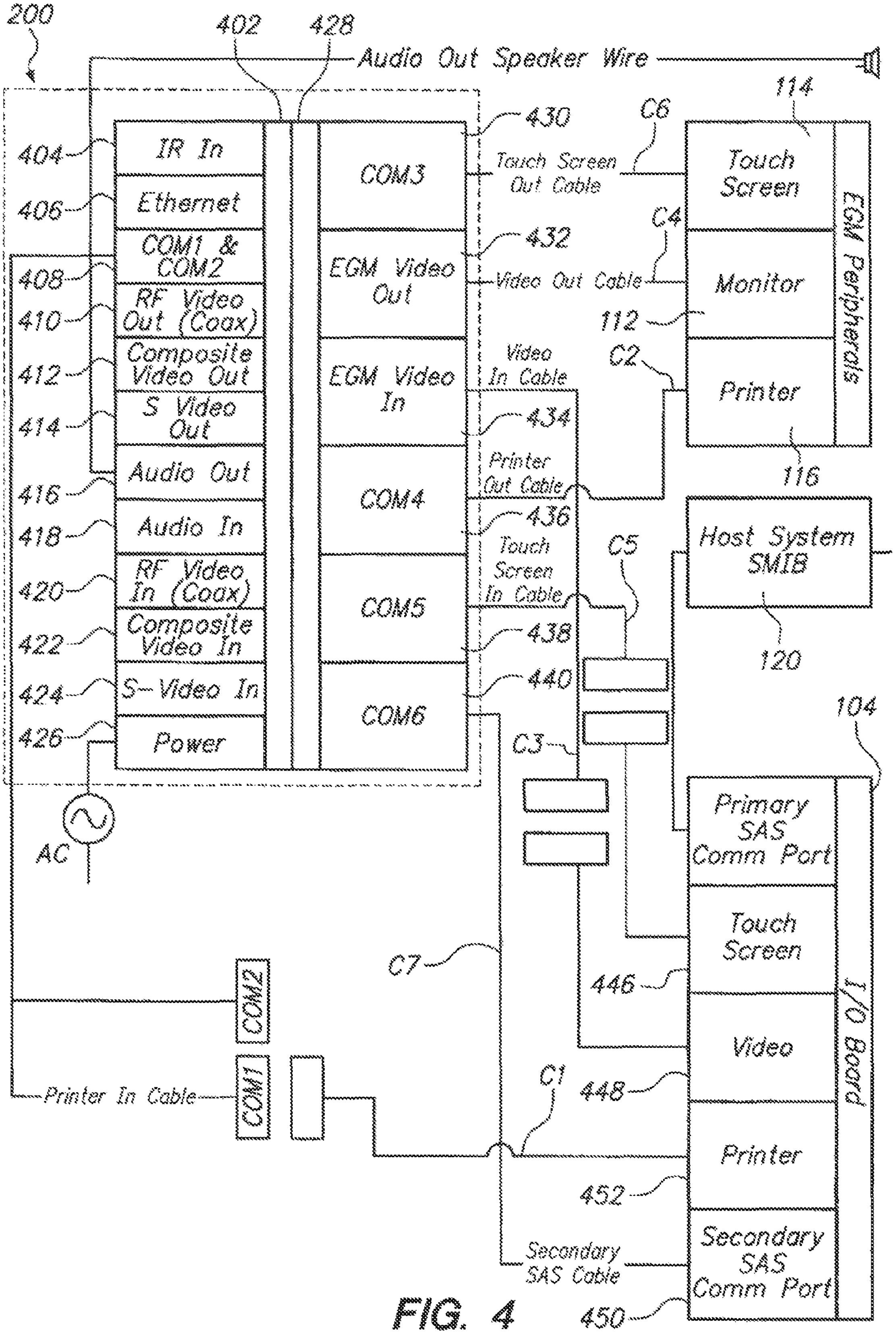
FIG. 4 is a schematic diagram of a secondary controller in accordance with the invention as interfaced with a gaming machine in accordance with an embodiment of the invention.

As indicated, the configuration of the SFCU 200 and the manner by which it interfaces with a gaming machine may vary, such as depending upon the configuration of the gaming machine. FIG. 4 schematically illustrates one embodiment of an SFCU 200 in accordance with the invention. As illustrated, the SFCU 200 comprises a base circuit board 402 having one or more components associated therewith. These components may include various processors and other circuitry. In addition, the components preferably include one or more communication ports. As illustrated, these ports include an infrared in (IR in) port 404, an Ethernet port 406, a COM1/COM2 port 408, a radio frequency video out (RF out) port 410, a composite video out port 412, an S-video out port 414, an audio out port 416, an audio in port 418, a radio frequency in (RF in) port 420, a composite video in port 422, and an S-video in port 424. As further illustrated, the base circuit board 402 may have a power port 426 for connection to a power supply.

In the illustrated embodiment, the SFCU 200 further has a secondary or daughter circuit board 428. Preferably, this daughter board is associated with, such as by connection to, the main or base board 402. The daughter board 428 preferably also includes a variety of components. As illustrated, these components comprise a COM 3 port 430, an EGM video out port 432, an EGM video in port 434, a COM 4 port 436, a COM 5 port 438, and a COM 6 port 440. It will be appreciated that the configuration of these ports may vary, preferably selected so that when those ports are connected to particular gaming machine components, communication there between is permitted.

Of course, the SFCU 200 may have other configurations. For example, the SFCU 200 might only comprise a single circuit board, rather than two circuit boards. Further, the number of communication ports and their location and type, may vary.

FIG. 4 also illustrates one particular configuration of connections between the SFCU 200 and other components. As illustrated, a first communication cable or connection C1 is provided between a printer port 452 of the electronic gaming machine I/O board 104 and the COM1 and COM2 port 408 of the main board 402 of the SFCU 200. A corresponding output communication cable or connection C2 is provided between the COM 4 port 436 of the daughter board 428 of the SFCU 200 and the printer 116 of the gaming machine.

A third communication cable or connection C3 is provided from a video out communication port 448 of an electronic gaming machine I/O board 104, This cable C3 is connected to the EGM video in port 434 of the daughter board 428 of the SFCU 200. A fourth communication cable or connection C4 is provided from the EGM video out port 432 of the daughter board 428 of the SFCU 200 to the video display 112 of the gaming machine.

A fifth communication cable or connection C5 is provided from a touch screen communication port 446 of the electronic gaming machine I/O board 104 and the COM 5 port 438 of the daughter board 428 of the SFCU 200, A sixth communication cable or connection C6 is provided between the COM 3 port 430 of the daughter board 428 of the SFCU 200 and a touch screen 114 of the gaming machine.

A seventh communication cable or connection C7 is provided between the COM 6 port 440 of the daughter board 428 of the SFCU 200 and a secondary SAS port 450 of the gaming machine I/O board 104.

Of course, though not shown, a variety of other cables or connections may be made to/from the SFCU 200. For example, video feed cable or connection may be provided between a video source (not shown) and the S-video in port 424 of the SFCU 200.

The SFCU 200 may also have a variety of other components. For example, the SFCU 200 may include one or more decoders or other processors for decoding or processing data feeds. Such processor(s) might comprise hardware and/or software associated with the SFCU 200 (for example, software stored in a memory device of the SFCU 200, such as a RAM chip mounted thereon, or a decoder or processor chip mounted thereon). For example, the SFCU 200 might include an MP3 decoder for decoding an MP3 music feed and providing a music output to the speakers of the gaming machine, and/or a decoder for MPEG-x (such as MPEG-4) compressed video or audio/video data. The SFCU 200 might also utilize software to read an RSS web feed. This read feed may then be displayed via a display of the gaming machine. In one embodiment, the SFCU 200 may be configured to link to the Internet or other networks. In such a configuration, the SFCU 200 may be configured with a web browser (such as Internet Explorer), whereby the SFCU 200 may display web-based content via a display of the gaming machine and a player may utilize the web browser to access the world wide web or web-based content at the gaming machine.

As indicated, the illustrated embodiment is but one exemplary embodiment of the invention. The configuration illustrated in FIG. 4 might vary, for example, depending upon the various features of the invention herein. For example, if one or more temperature sensors are provided, cables or connections may be provided between those sensors and one or more communication ports of the SFCU 200 (such ports may be existing ports, or the SFCU 200 might have a different configuration including additional ports for such connections).

In one embodiment, the SFCU 200 could be configured to output information to two or more displays. Those displays could also be associated with the gaming machine's electronic gaming controller, or be separate there from. For example, a secondary video display could be associated solely with the SFCU 200, whereby information is provided only by the SFCU 200 to that display. The gaming machine could have a first display which is controlled by the gaming machine EGM and/or the SFCU 200. For example, in such a configuration, the SFCU 200 may cause advertising information to be displayed on the second display, while game content generated by the gaming machine EGM is displayed on the first display.

In one embodiment, the one or more external servers may be located locally (such as at the casino) or remotely (such as at a site remote from the casino). In this regard, the SFCU 200 may be configured to communicate with one or more LANS, WANS or other communication networks (whether wired or wireless).

As indicated, the SFCU 200 could be configured to implement various functionality at a gaming machine. For example, streaming media may be provided from one or more remote servers to the SFCU 200 for display at the gaming machine. Such information could be displayed at the gaming machine's video display along with game content provided by the gaming machine EGM, or separately there from.

In one embodiment, the SFCU 200 of each of a plurality of gaming machines may be provided information from one or more external servers, causing the SFCUs of those gaming machines to operate in unison. For example, a remote server may provide information to the SFCUs associated with a bank of gaming machines, causing the displays of those gaming machines to display common messages or other information. Such information could be displayed sequentially (for example, where the message "travels" along the displays of the machines in sequence) or in unison (where the entire message comprises portions of information displayed at the individual displays).

In one embodiment, a player may provide input to the SFCU 200 via the touch screen of the gaming machine (as illustrated in FIG. 2, for example). However, the SFCU 200 might be configured to receive input from other devices, whether such comprise input devices associated with the gaming machine in general (such as gaming machine buttons) or those which are specifically associated with the SFCU 200. For example, the buttons of an existing gaming machine may be used to receive input relative to game play when a player is playing a game, but may also be configured to provide secondary activity input when such secondary activities are enabled. For example, in the case a player is offered the opportunity to purchase a keno ticket upon cash-out, the gaming machine's "max bet" button may be used as the input from a player for such a purchase.

In one embodiment, the SFCU 200 may be used to display game information based upon main game outcomes or results. For example, referring to FIGS. 2 and 3, the master gaming controller 102 may generate a numeric value representing a main game result. Before that outcome is displayed, the SFCU 200 may intercept the outcome or result information and utilize it to generate the result of a different game to be displayed by the player. In other words, in this configuration, the result of the base game is not displayed at all, and instead a different result is displayed. In one embodiment, the main game outcome information may be transmitted to the remote server 202, which then generate the secondary or "reskinned" game outcome information and transmits it back to the main game via the SFCU 200 for presentation. In another embodiment, the information may be stored locally at the SFCU 200. In this manner, the master gaming controller 102 of the gaming machine essentially acts as a random number generator for the SFCU 200.

As one example, the master gaming controller 102 may be configured to generate video slot game results based upon a first set of symbols. Each result may correspond to a numeric value. The SFCU 200 may utilize the generated numeric value to define a different game outcome, such as a completely different slot game outcome representation based upon a different, second set of symbols. In this manner, one or more games at the gaming machine may be easily "re-themed" from an old theme to a new theme, without the need to modify the master gaming controller 102.

As indicated, various information may be provided to the SFCU 200 for use at the gaming machine. This information might comprise updated graphics or image files or other data or information.

In one embodiment, the SFCU 200 could be configured to display progressive or other jackpot information at the gaming machine. If such information is available at the machine, the SFCU 200 may obtain that information and then cause it to be displayed at the display of the machine. For example, if a large jackpot is available at the machine, when the machine is idle, the SFCU 200 could cause the display of the machine to display that jackpot information in order to attract players. In the event progressive or other jackpot information is available externally, such as via a jackpot controller associated with a bank of gaming machines, a communication link could be provided between the SFCU 200 and that bank controller, whereby the jackpot information can again then be displayed directly at the machine, including at times other than in association with the play of a particular game.

It will be appreciated that FIGS. 2-4 illustrate just one gaming machine associated with the remote server 202. Of course, in a gaming environment, a plurality of gaming machines, either as modified to include an SFCU 200 or not, may be provided. For example, a bank of gaming machines may be modified in accordance with the present invention to include an SFCU 200. As indicated herein, the remote server or servers 202 may be configured to control those SFCUs 200 in a manner that they perform certain functions together.

One aspect of the invention is a method of modifying an existing gaming machine. As indicated above, such a method preferably includes providing a gaming machine having existing peripheral devices controlled by a master gaming controller. A secondary controller is interposed between the master gaming controller and one or more of the peripherals. In one embodiment, this may comprise severing the communication links between the master gaming controller and the peripherals, and forming new communication links, as detailed above (wherein communication links are provided between the master gaming controller (or I/O board) and the secondary controller, and then the secondary controller and the peripheral devices.

The embodiments of the invention have numerous advantages and benefits. In accordance with the invention, an existing gaming machine can be conveniently and inexpensively modified to provide additional or secondary functionality. This functionality may include additional games and other entertaining features or events. Such modifications are useful in maintaining the profitability of the gaming machine, or adding profitability to the machine. For example, the secondary functions may be used to maintain player interest in play of the machine, such as by offering entertainment in addition to wagering events. This can be used to increase player seat time at the gaming machine, thus increasing the time they are engaged in wagering events. In addition, the secondary functions may comprise games other than those the gaming machine was originally configured to offer. By offering new and different games, the profitability of the gaming machine can be increased.

An important aspect of the invention is the manner by which the secondary functionality is added to an existing gaming machine. In the preferred embodiment of the invention, the secondary functionality is facilitated by a controller which does not modify or alter the master gaming controller. One way to reconfigure a gaming machine is to change the master gaming controller and/or its associated memory. For example, the master gaming controller of a gaming machine could be reprogrammed to present new games. This, however, still does not permit the gaming machine to provide the wide variety of secondary functions permitted by the present invention. In addition, such changes require approval by local gaming authorities. This approval takes substantial time and requires substantial expense and must be provided for each variation of a modified master gaming controller.

In a preferred embodiment of the invention, a secondary controller is provided between a master gaming controller and one or more peripherals. The secondary controller does not communicate directly with the master gaming controller. As a result, the modification to an existing gaming machine does not modify the master gaming controller and thus does not require the same regulatory approval. In addition, as indicated above, the secondary functionality which can be implemented includes not only different games, but gaming machine monitoring and control functions as well as entertainment functions.

In a preferred embodiment, the secondary controller takes advantage of communication paths between the master gaming controller and one or more peripherals or other components, and utilizes those peripherals or components to present the secondary functionality. As indicated, the secondary controller may utilize the display, touch screen and printer of an existing gaming machine in order to present games, entertainment and other events.

The configuration of the invention is uniquely suited to use in modifying an existing gaming machine. However, as also indicated herein, the invention may be utilized to create a gaming machine or kiosk. Further, the invention may be used in a variety of other configurations than just as illustrated. For example, the secondary controller could be used with existing gaming machines have a wide variety of configurations other than that described above and illustrated in FIG. 1.

As indicated the apparatus and system of the invention may be utilized in a wide variety of environments and applications. For example, a secondary controller may be associated with a "server based" gaming machine. Such a gaming machine, which may simply comprise a terminal or kiosk, may not have the configuration detailed in FIG. 1. Gaming content may be generated externally, such as at a server, and be provided to the gaming machine, rather than by being generated by a master gaming controller. However, a secondary controller may still be associated with such a terminal, kiosk or other device, taking advantage of the various peripheral or other components thereof to provide secondary functionality.

In another embodiment, the secondary controller could be utilized to update an existing gaming machine by removing the functionality of the master gaming controller. Instead of replacing the master gaming controller, the secondary controller could be interposed into the machine and all gaming machine control could be affect via the secondary controller.

It will be understood that the above described arrangements of apparatus and the method there from are merely illustrative of applications of the principles of this invention and many other embodiments and modifications may be made without departing from the spirit and scope of the invention as defined in the claims.

The invention is claimed as follows:

1. A gaming system comprising:
a housing;
a plurality of input devices supported by the housing, said plurality of input devices including:
(i) an acceptor, and
(ii) a cashout device;
at least one display device supported by the housing;
at least one printer supported by the housing;
a master gaming controller configured to operate with the at least one display device, the plurality of input devices, and the at least one printer to:
(a) if a physical item is received via the acceptor, establish a credit balance based, at least in part, on a monetary value associated with the received physical item,
(b) for a play of a game:
(i) determine a game outcome, and
(ii) cause the at least one display device to display the determined game outcome, and
(c) if the credit balance has a value greater than zero and a cashout input is received via the cashout device, transmit, to the at least one printer, a print ticket instruction associated with causing the at least one printer to print a ticket associated with the credit balance having the value greater than zero; and
a secondary controller configured to operate with the at least one display device, the plurality of input devices, and the at least one printer to:
(a) monitor for any print ticket instructions transmitted by the master gaming controller, and
(b) if a designated print ticket instruction is transmitted by the master gaming controller:
(i) cause the at least one printer to not print any ticket associated with the credit balance having the value greater than zero, and
(ii) cause the at least one display device to display an alert associated with the at least one printer not printing any ticket associated with the credit balance having the value greater than zero.

2. The gaming system of claim 1, wherein the secondary controller is configured to cause the at least one printer to not print any ticket associated with the credit balance by intercepting the designated print ticket instruction transmitted from the master gaming controller to the at least one printer.

3. The gaming system of claim 1, wherein the secondary controller is interposed between the master gaming controller and the at least one printer.

4. The gaming system of claim 3, wherein a first communication link connects the master gaming controller and the secondary controller, and a second communication link connects the secondary controller and the at least one printer.

5. A peripheral device controller comprising:
at least one processor; and
at least one memory device which stores a plurality of instructions, which when executed by the at least one processor, cause the at least one processor to:
(a) monitor for any print ticket instructions transmitted from a gaming machine master gaming controller to at least one gaming machine printer, said print ticket instructions being associated with causing the at least one gaming machine printer to print a ticket associated with a credit balance having a value greater than zero and being transmitted from the gaming machine master gaming controller to the at least one gaming machine printer if a cashout input is received via a gaming machine cashout device, and (b) if a designated print ticket instruction is transmitted from the gaming machine master gaming controller to the at least one gaming machine printer:

(i) cause the at least one gaming machine printer to not print any ticket associated with the credit balance having the value greater than zero, said credit balance being increasable via a gaming machine acceptor of a physical item associated with a monetary value, and decreasable via the gaming machine cashout device, and (ii) cause at least one gaming machine display device to display an alert associated with the at least one gaming machine printer not printing any ticket associated with the credit balance having the value greater than zero.

6. The peripheral device controller of claim 5, wherein when instructed by the at least one processor, the plurality of instructions cause the at least one processor to cause the at least one gaming machine printer to not print any ticket associated with the credit balance by intercepting the designated print ticket instruction transmitted from the gaming machine master gaming controller to the at least one gaming machine printer.

7. The peripheral device controller of claim 5, wherein the at least one processor is interposed between the gaming machine master gaming controller and the at least one gaming machine printer.

8. The peripheral device controller of claim 7, wherein a first communication link connects the gaming machine master gaming controller and the at least one processor, and a second communication link connects the at least one processor and the at least one gaming machine printer.

9. The peripheral device controller of claim 5, which transmits and receives data over a data network.

10. The peripheral device controller of claim 9, wherein the data network is an internet.

11. A method of operating a gaming system, said method comprising:

(a) if a physical item is received via an acceptor, causing a master gaming controller to establish a credit balance based, at least in part, on a monetary value associated with the received physical item, (b) for a play of a game:

(i) causing the master gaming controller determine a game outcome, and (ii) causing at least one display device to display the determined game outcome, and (c) if the credit balance has a value greater than zero and a cashout input is received via a cashout device, causing the master gaming controller to transmit, to at least one printer, a print ticket instruction associated with causing the at least one printer to print a ticket associated with the credit balance having the value greater than zero, (d) causing a secondary controller to monitor for any print ticket instructions transmitted by the master gaming controller, and (e) if a designated print ticket instruction is transmitted by the master gaming controller:

(i) causing the secondary controller to cause the at least one printer to not print any ticket associated with the credit balance having the value greater than zero, and (ii) causing the at least one display device to display an alert associated with the at least one printer not printing any ticket associated with the credit balance having the value greater than zero.

12. The method of claim 11, which includes causing the secondary controller to cause the at least one printer to not print any ticket associated with the credit balance by intercepting the designated print ticket instruction transmitted from the master gaming controller to the at least one printer.

13. The method of claim 11, which is provided through a data network.

14. The method of claim 13, wherein the data network is an internet.

15. A method of operating a peripheral device controller, said method comprising:

(a) monitoring for any print ticket instructions transmitted from a gaming machine master gaming controller to at least one gaming machine printer, said print ticket instructions being associated with causing the at least one gaming machine printer to print a ticket associated with a credit balance having a value greater than zero and being transmitted from the gaming machine master gaming controller to the at least one gaming machine printer if a cashout input is received via a gaming machine cashout device, and (b) if a designated print ticket instruction is transmitted from the gaming machine master gaming controller to the at least one gaming machine printer:

(i) causing the at least one gaming machine printer to not print any ticket associated with the credit balance having the value greater than zero, said credit balance being increasable via a gaming machine acceptor of a physical item associated with a monetary value, and decreasable via the gaming machine cashout device, and (ii) causing at least one gaming machine display device to display an alert associated with the at least one gaming machine printer not printing any ticket associated with the credit balance having the value greater than zero.

16. The method of claim 15, which includes causing the at least one gaming machine printer to not print any ticket associated with the credit balance by intercepting the designated print ticket instruction transmitted from the gaming machine master gaming controller to the at least one gaming machine printer.

17. The method of claim 15, which is provided through a data network.

18. The method of claim 17, wherein the data network is an internet.

* * * * *